(12) United States Patent
Miyazaki et al.

(10) Patent No.: US 8,582,029 B2
(45) Date of Patent: Nov. 12, 2013

(54) PICTURE SIGNAL PROCESSING UNIT, IMAGE DISPLAY UNIT, AND PICTURE SIGNAL PROCESSING METHOD

(75) Inventors: Shinichiro Miyazaki, Kanagawa (JP); Tomoichi Fujisawa, Kanawaga (JP)

(73) Assignee: Sony Corporation (JP)

( * ) Notice: Subject to any disclaimer, the term of this patent is extended or adjusted under 35 U.S.C. 154(b) by 649 days.

(21) Appl. No.: 12/583,369

(22) Filed: Aug. 19, 2009

(65) Prior Publication Data

US 2010/0053429 A1    Mar. 4, 2010

(30) Foreign Application Priority Data

Aug. 26, 2008    (JP) .................... 2008-217329

(51) Int. Cl.
H04N 7/01    (2006.01)
H04N 11/20    (2006.01)

(52) U.S. Cl.
USPC ........... 348/441; 348/513; 348/459; 348/443; 348/447; 348/448; 348/452; 348/458; 348/699; 348/700; 345/213

(58) Field of Classification Search
USPC ......... 348/441, 513, 459, 699, 443, 447, 448, 348/452, 458, 700
See application file for complete search history.

(56) References Cited

U.S. PATENT DOCUMENTS

| | | | | |
|---|---|---|---|---|
| 5,642,170 | A * | 6/1997 | Hackett et al. | 348/459 |
| 5,929,913 | A * | 7/1999 | Etoh | 375/240.11 |
| 6,909,466 | B1 * | 6/2005 | Scheffler et al. | 348/459 |
| 2003/0107672 | A1 | 6/2003 | Hoshino et al. | |
| 2006/0267904 | A1 | 11/2006 | Aiba | |
| 2009/0009455 | A1 * | 1/2009 | Kimura | 345/89 |
| 2009/0080789 | A1 * | 3/2009 | Shoji | 382/254 |
| 2010/0033620 | A1 * | 2/2010 | Hoshino et al. | 348/441 |

FOREIGN PATENT DOCUMENTS

| | | |
|---|---|---|
| EP | 1513344 A1 | 3/2005 |
| EP | 2018052 A1 | 1/2009 |
| JP | 2001-268475 A | 9/2001 |
| JP | 2003-189257 A | 7/2003 |

(Continued)

OTHER PUBLICATIONS

Office Action from Japanese Application No. 2008-217329, dated Aug. 31, 2010.

(Continued)

*Primary Examiner* — Jefferey Harold
*Assistant Examiner* — Mustafizur Rahman
(74) *Attorney, Agent, or Firm* — Lerner, David, Littenburg, Krumholz & Mentlik, LLP

(57) ABSTRACT

A picture signal processing unit having a first and a second double rate conversion section, a storage section, and a quadruple rate conversion section is provided. The first double rate conversion section inserts a first interpolation frame between a couple of successive original frames to output the original frames and the first interpolation frames. The second double rate conversion section generates a second and a third interpolation frames and allocates the second and the third interpolation frames between the couple of successive original frames to output the second and the third interpolation frames. The storage section stores the original frame and the first to the third interpolation frames. The quadruple rate conversion section sequentially reads out the original frame and the first to the third interpolation frames from the storage section in a quadruple rate to output the original frame and the first to the third interpolation frames.

18 Claims, 13 Drawing Sheets

(56) References Cited

FOREIGN PATENT DOCUMENTS

| JP | 2005006275 A | 1/2005 |
|---|---|---|
| JP | 2006310985 A | 11/2006 |
| JP | 2006337448 A | 12/2006 |
| JP | 2006352611 A | 12/2006 |
| JP | 2007271842 A | 10/2007 |
| WO | 2004102963 A1 | 11/2004 |

OTHER PUBLICATIONS

Partial European Search Report EP 09168724, dated Jul. 1, 2011.
European Search Report EP 09168724, dated Feb. 16, 2012.
Office Action from Japanese Application No. 2010-213153, dated Sep. 4, 2012.
Office Action from Japanese Application No. 2010-213153, dated May 23, 2012.

* cited by examiner

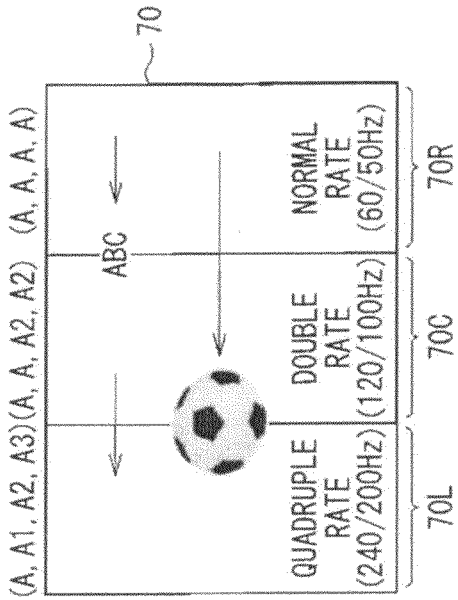
FIG. 4A
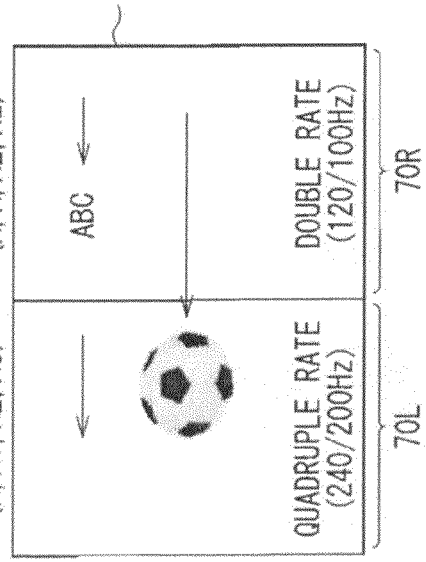
FIG. 4B
| QUADRUPLE RATE DISPLAY FRAME | LEFT SCREEN (70L) | RIGHT SCREEN (70R) |
|---|---|---|
| ORIGINAL FRAME | A | A |
| 1/4 FRAME | A1 | A |
| 1/2 FRAME | A2 | A2 |
| 3/4 FRAME | A3 | A2 |
| VALUE OF H COUNTER | 0~959 | 960~1919 |
| | LEFT SCREEN (70L) | CENTRAL SCREEN (70C) | RIGHT SCREEN (70R) |
|---|---|---|---|
| | A | A | A |
| | A1 | A | A |
| | A2 | A2 | A |
| | A3 | A2 | A |
| | 0~639 | 640~1279 | 1280~1919 |
FIG. 4C

PRINCIPLE OF ADDRESS CALCULATION BY INTERPOLATOR

| Out_phase | 0 | 1 | 2 | 3 |
|---|---|---|---|---|
| Camera | Relpos_C_0 [5:0] | Relpos_C_1 [5:0] | Relpos_C_2 [5:0] | Relpos_C_3 [5:0] |
| SET VALUE | 0 | 0.25 | 0.5 | 0.75 |

INTERPOLATION POSITION PARAMETER OF EACH FRAME

FIG. 9A
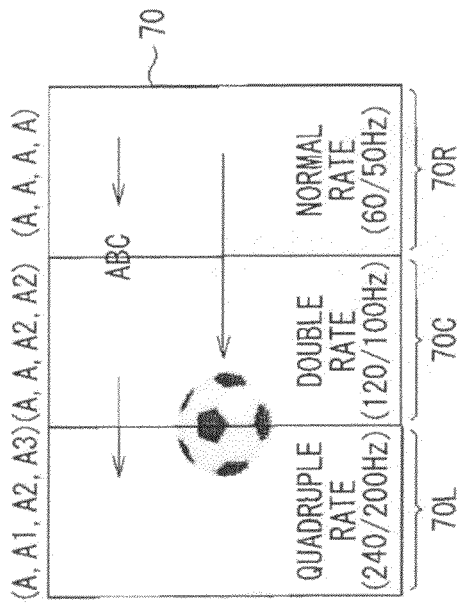
FIG. 9B
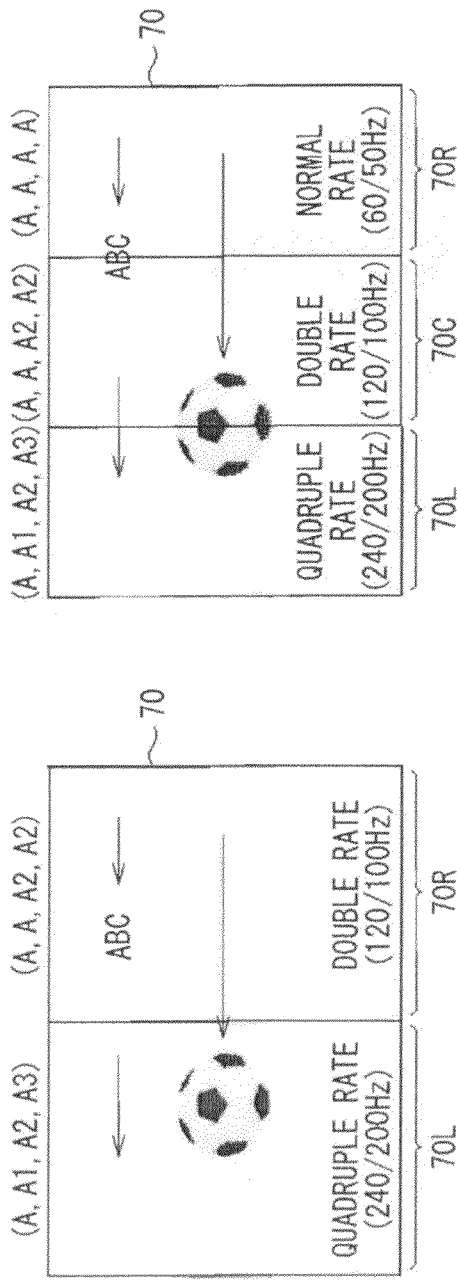
FIG. 9C

PICTURE SIGNAL PROCESSING UNIT, IMAGE DISPLAY UNIT, AND PICTURE SIGNAL PROCESSING METHOD

CROSS-REFERENCE TO RELATED APPLICATION

The present application claims priority from Japanese Patent Application No. JP 2008-217329 filed in the Japanese Patent Office on Aug. 26, 2008, the entire content of which is incorporated herein by reference.

BACKGROUND OF THE INVENTION

1. Field of the Invention

The present invention relates to a picture signal processing unit that performs frame rate conversion of a picture signal by using motion compensation, to a picture signal processing method, and to an image display unit including the picture signal processing unit.

2. Description of the Related Art

As one of picture signal processing for improving image quality in a television receiver, a DVD (Digital Versatile Disk) player and the like, there is frame rate conversion which utilizes motion compensation.

A description will be given of the principles of the frame rate conversion by taking a picture signal obtained by a television broadcasting camera (hereinafter referred to as a camera signal) as an example with reference to FIG. 11A to FIG. 13C.

FIG. 11A illustrates original frames A, B, C, and D of an NTSC (National Television System Committee) type camera signal. FIG. 11B illustrates a case in which the frame rate of the camera signal is converted from 60 Hz (normal rate) to 120 Hz (double rate). That is, every one interpolation frame is added to between adjacent original frames (between the frame A and the frame B, between the frame B and the frame C, and between the frame C and the frame D) at intervals of 1/120 sec.

FIGS. 12A and 12B illustrate a case in which the frame rate of the camera signal is converted from 60 Hz (normal rate) to 240 Hz (quadruple rate). That is, every three interpolation frames are added to between adjacent original frames (between the frame A and the frame B, between the frame B and the frame C, and between the frame C and the frame D) at intervals of 1/240 sec.

Each interpolation frame is generated by interpolating a picture of a previous original frame and a picture of a subsequent frame. Such interpolation is performed based on a parameter of an interpolation position of each picture in each interpolation frame and a motion vector between the previous original frame and the subsequent original frame. Specifically, such interpolation is performed by the following method. That is, after addresses of pixels of the previous and subsequent original frames used for calculating a pixel value of the interpolation frame are calculated based thereon, the pixel values of these addresses are applied with weighting in accordance with the interpolation position.

For example, as illustrated in FIG. 13A to FIG. 13C, such frame rate conversion has an effect of resolving motion blurring in the camera signal and an effect of reducing judder in a motion picture by a film signal. Specifically, first, in the existing picture (60 frames per 1 second: normal rate) illustrated in FIG. 13A, a difference between a first picture A and a next picture B is large and thus a persistence of vision appears. On the other hand, in the double rate picture (120 frames per 1 second) illustrated in FIG. 13B, one interpolation picture A2 is inserted between the picture A and the picture B (middle position: interpolation position="0.5"), the picture amount is doubled, and thus persistence of vision is more decreased compared to the normal rate picture. Further, in the quadruple rate picture (240 frames per 1 second) illustrated in FIG. 13C, three interpolation pictures A1 to A3 are inserted between the picture A and the picture B (interpolation positions="0.25," "0.5," and "0.75"), and thus the picture amount is quadrupled. Thereby, the persistence of vision is further decreased compared to the double rate picture, and the persistence of vision hardly appears.

Examples of technologies for the foregoing frame rate conversion include a technology proposed in Japanese Unexamined Patent Application Publication No. 2003-189257.

SUMMARY OF THE INVENTION

In performing the quadruple rate frame rate conversion as illustrated in FIGS. 12A to FIG. 13C, in the case where quadruple rate frame rate conversion is directly performed for a normal rate (60 Hz) input picture signal by one semiconductor chip (LSI: Large Scale Integration), the manufacturing cost of such a semiconductor chip may be increased. Therefore, it is desirable to realize the quadruple rate frame rate conversion for the input picture signal while keeping the manufacturing cost low.

Further, for the purpose of promoting product sale by effectively demonstrating a difference in a display image quality between the display picture by double rate or by quadruple rate and the display picture by normal rate (for example, a difference of reduction effect of persistence of vision) as illustrated in FIG. 11A to FIG. 13C to consumers, picture display by a so-called demonstration mode is performed at shops or the like in some cases.

Specifically, the demonstration mode for demonstrating the display image quality difference between the display picture by double rate and the display picture by normal rate in, for example, a double rate TV set is performed, for example, as illustrated in FIG. 14A. That is, first, a display panel (display screen) 170 is divided into a screen on the left viewed from a consumer (left screen) 170L and a screen on the right viewed from a consumer (right screen) 170R. The picture by double rate is displayed on the left screen 170L and the picture by normal rate is displayed on the right screen 170R, and motion telop, horizontal camera pan and the like are used to allow a customer to feel a difference of effect on motion blurring (a difference of reduction effect of persistence of vision). In this case, a motion compensation function is partially disabled in the right screen 170R to realize display picture by partial normal rate.

FIG. 14B illustrates an example of a demonstration mode in, for example, a quadruple rate TV set. In the demonstration mode, a picture by quadruple rate is displayed on the left screen 170L and a picture by normal rate is displayed on the right screen 170R, and motion telop, horizontal camera pan and the like are used to allow the customer to feel an effect of quadruple rate on motion blurring (reduction effect of persistence of vision). Also in this case, a motion compensation function is partially disabled in the right screen 170R to realize display picture by partial normal rate.

However, in the demonstration mode illustrated in FIG. 14B, though the consumer is able to confirm the display image quality difference between the display picture by quadruple rate and the display picture by normal rate, the consumer is not able to confirm the image quality difference between the display picture by double rate and the display picture by quadruple rate. Therefore, in such a demonstration mode, superiority of the quadruple rate TV set to the double rate TV set that has been sold in the past is not able to be sufficiently demonstrated to the consumer.

It is desirable to provide a picture signal processing unit, an image display unit, and a picture signal processing method, capable of performing quadruple frame rate conversion for an input picture signal while keeping the manufacturing cost low.

It is also desirable to provide a picture signal processing unit, an image display unit, and a picture signal processing method, that generate an output picture signal that effectively allows a customer to feel the image quality difference between the display picture by double rate and the display picture by quadruple rate.

According to an embodiment of the invention, there is provided a first picture signal processing unit including: a first double rate conversion section performing double frame rate conversion on an input picture signal configured of original frames through additionally inserting a first interpolation frame between a couple of successive original frames, the first interpolation frame being generated by interpolation with motion compensation from the couple of successive original frames, and then the first double rate conversion section outputting a picture signal configured of the original frames and the first interpolation frames; a second double rate conversion section performing double frame rate conversion on the input picture signal through generating a second and a third interpolation frames followed by allocating the second and the third interpolation frames at predetermined time positions between the couple of successive original frames in place of the couple of successive original frames, the second and the third interpolation frames being generated by interpolation with motion compensation from the couple of successive original frames, and then the second double rate conversion section outputting a picture signal configured of the second and the third interpolation frames; a storage section storing the original frame and the first to the third interpolation frames; and a quadruple rate conversion section performing quadruple frame rate conversion on the input picture signal through sequentially reading out the original frame and the first to the third interpolation frames from the storage sections in a quadruple rate, and then the quadruple rate conversion section outputting an output picture signal configured of the original frame and the first to the third interpolation frames.

According to an embodiment of the invention, there is provided a first image display unit including the first picture signal processing unit and a display section displaying a picture based on the output picture signal outputted from the quadruple rate conversion section.

According to an embodiment of the invention, there is provided a first picture signal processing method including the steps of: performing double frame rate conversion on an input picture signal configured of original frames through additionally inserting a first interpolation frame between a couple of successive original frames, the first interpolation frame being generated by interpolation with motion compensation from the couple of successive original frames, and then outputting a picture signal configured of the original frames and the first interpolation frames; performing double frame rate conversion on the input picture signal through generating a second and a third interpolation frames followed by allocating the second and the third interpolation frames at predetermined time positions between the couple of successive original frames in place of the couple of successive original frames, the second and the third interpolation frames being generated by interpolation with motion compensation from the couple of successive original frames, and then outputting a picture signal configured of the second and the third interpolation frames; storing the original frame and the first to the third interpolation frames; and performing quadruple frame rate conversion on the input picture signal through sequentially reading out the original frame and the first to the third interpolation frames in a quadruple rate, and then outputting an output picture signal configured of the original frame and the first to the third interpolation frames.

In the first picture signal processing unit, the first image display unit, and the first picture signal processing method of the embodiments of the invention, the double frame rate conversion is performed on the input picture signal configured of the original frames through additionally inserting the first interpolation frame between the couple of successive original frames, in which the first interpolation frame is generated by interpolation with the motion compensation from the couple of successive original frames, and then the picture signal configured of the original frames and the first interpolation frames is outputted. In addition, the double frame rate conversion is performed on the input picture signal through generating the second and the third interpolation frames followed by allocating the second and the third interpolation frames at predetermined time positions between the couple of successive original frames in place of the couple of successive original frames, in which the second and the third interpolation frames are generated by interpolation with the motion compensation from the couple of successive original frames, and then the picture signal configured of the second and the third interpolation frames is outputted. Further, the original frame and the first to the third interpolation frames are stored, and the quadruple frame rate conversion is performed on the input picture signal through sequentially reading out the original frame and the first to the third interpolation frames in the quadruple rate, and then the output picture signal configured of the original frame and the first to the third interpolation frames is outputted. Accordingly, after the double rate frame rate conversion for the input picture signal is performed respectively and separately in the two paths, the quadruple rate frame rate conversion for the input picture signal is performed. Thereby, compared to a case in which the quadruple rate frame rate conversion is directly performed to the input picture signal, the quadruple rate frame rate conversion is realized with a simple structure.

In the first picture signal processing unit of the embodiment of the invention, the quadruple rate conversion section may have: a horizontal counter counting horizontal pixel position in a displayed picture displayed based on the output picture signal; a vertical counter counting vertical pixel position in the displayed picture; and an address generation section generating read addresses used in reading out the original frame and the first to the third interpolation frames from the storage section according to count values in the horizontal counter and the vertical counter. The read address is switched as needed according to the count values in the horizontal counter and the vertical counter. In this case, by switching the read addresses according to the count values of the horizontal counter and the vertical counter as needed, the output picture signal in which a display picture by the quadruple rate and a display screen by the double rate are simultaneously displayed in a display screen is able to be generated.

According to an embodiment of the invention, there is provided a second picture signal processing unit including: a quadruple rate conversion section performing quadruple frame rate conversion on a input picture signal configured of original frames through additionally inserting a first to a third interpolation frames between a couple of successive original frames, the first to the third interpolation frames being generated by interpolation with motion compensation from the couple of successive original frames, and then the quadruple rate conversion section outputting an output picture signal configured of the original frame and the first to the third interpolation frames; a horizontal counter counting horizontal pixel position in a displayed picture displayed based on the output picture signal; a vertical counter counting vertical pixel position in the displayed picture; and a parameter switch section selecting one of four interpolation position parameters configured of an interpolation position parameter corresponding to the original frame and interpolation position parameters corresponding to the first to the third interpolation frames according to count values in the horizontal counter and the vertical counter, and the parameter switch section switching the four interpolation position parameters, as needed, to output one of the four interpolation position parameters to the quadruple rate conversion section.

According to an embodiment of the invention, there is provided a second image display unit including the second picture signal processing unit and a display section displaying a picture based on the output picture signal outputted from the quadruple rate conversion section.

According to an embodiment of the invention, there is provided a second picture signal processing method including the steps of: performing quadruple frame rate conversion on a input picture signal configured of original frames through additionally inserting a first to a third interpolation frames between a couple of successive original frames, the first to the third interpolation frames being generated by interpolation with motion compensation from the couple of successive original frames, and then outputting an output picture signal configured of the original frame and the first to the third interpolation frames; and selecting one of four interpolation position parameters configured of an interpolation position parameter corresponding to the original frame and interpolation position parameters corresponding to the first to the third interpolation frames according to count values in a horizontal counter and a vertical counter, and switching the four interpolation position parameters, as needed, to output one of the four interpolation position parameters. The selected and outputted interpolation position parameter is used in the quadruple rate frame rate conversion.

In the second picture signal processing unit, the second image display unit, and the second picture signal processing method of the embodiments of the invention, the quadruple frame rate conversion is performed on the input picture signal configured of the original frames through additionally inserting the first to the third interpolation frames between the couple of successive original frames, in which the first to the third interpolation frames are generated by interpolation with the motion compensation from the couple of successive original frames, and then outputting the output picture signal configured of the original frame and the first to the third interpolation frames. In addition, one of four interpolation position parameters configured of the interpolation position parameter corresponding to the original frame and interpolation position parameters corresponding to the first to the third interpolation frames is selected according to the count values in the horizontal counter and the vertical counter, and the four interpolation position parameters is switched as needed, to output one of the four interpolation position parameters. The selected and outputted interpolation position parameter is used in the quadruple rate frame rate conversion. By selecting, switching as needed, and outputting one of the four interpolation position parameters according to the count values of the horizontal counter and the vertical counter, the output picture signal in which display picture by the double rate and display screen by the quadruple rate are simultaneously displayed in a display screen is able to be generated.

According to the first picture signal processing unit, the first image display unit, and the first picture signal processing method of the embodiments of the invention, after the double rate frame rate conversion for the input picture signal is performed respectively and separately in the two paths, the quadruple rate frame rate conversion for the input picture signal is performed. Thus, compared to the case in which the quadruple frame rate conversion is directly performed to the input picture signal, the quadruple rate frame rate conversion is realized with a simple structure. Therefore, the quadruple rate frame rate conversion for the input picture signal is able to be performed while the manufacturing cost is kept low.

According to the second picture signal processing unit, the second image display unit, and the second picture signal processing method of the embodiments of the invention, one of four interpolation position parameters configured of the interpolation position parameter corresponding to the original frame and interpolation position parameters corresponding to the first to the third interpolation frames is selected according to the count values in the horizontal counter and the vertical counter, and the four interpolation position parameters is switched as needed, to output one of the four interpolation position parameters. Thus, the output picture signal in which the display picture by the double rate and the display screen by the quadruple rate are simultaneously displayed in the display screen is able to be generated. Therefore, the output picture signal capable of effectively allowing a customer to feel the display image quality difference between the display picture by the double rate and the display picture by the quadruple rate is able to be generated.

Other and further objects, features and advantages of the invention will appear more fully from the following description.

BRIEF DESCRIPTION OF THE DRAWINGS

FIGS. 4A to 4C are diagrams for explaining an example of a demonstration mode according to the first embodiment.

FIGS. 9A to 9C are diagrams for explaining an example of a demonstration mode according to a second embodiment.

DETAILED DESCRIPTION OF THE PREFERRED EMBODIMENTS

Embodiments of the invention will be hereinafter described in detail with reference to the drawings. The description will be given in the following order.
1. First embodiment (example of combination of double rate frame rate conversion and quadruple rate frame rate conversion)
2. Second embodiment (example of a case directly performing quadruple rate frame rate conversion)
3. Modified example
[1. First Embodiment]
[Structural Example of Whole Image Display Unit]

Figure 1:
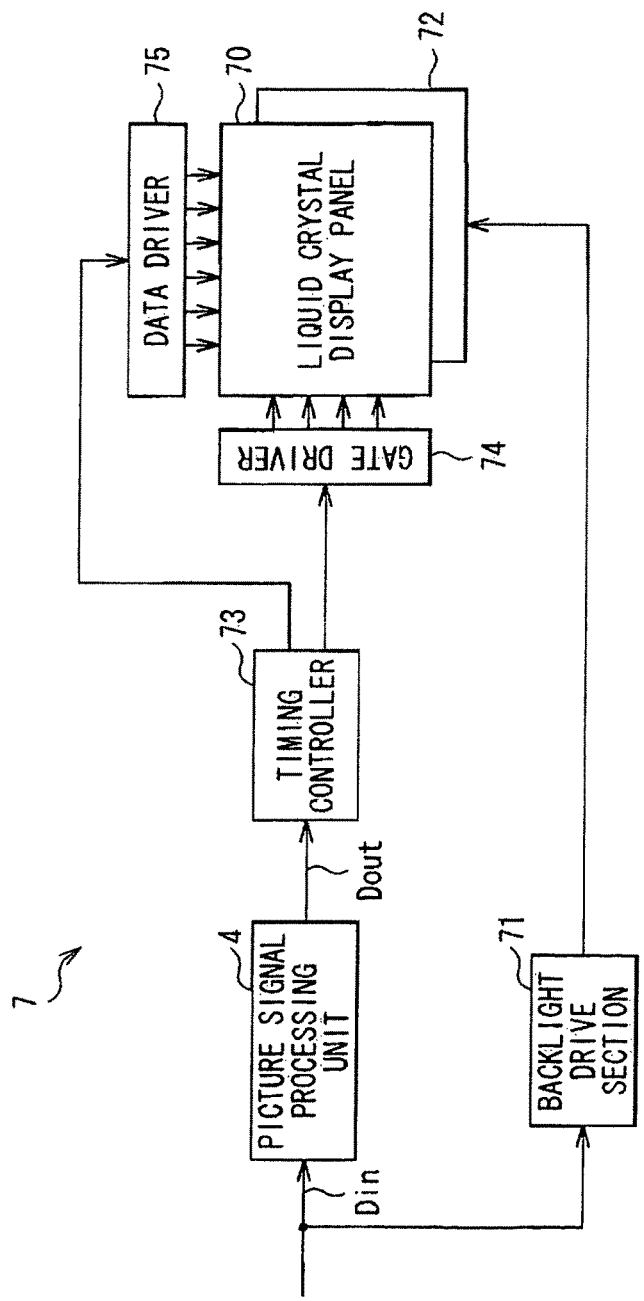
FIG. 1 is a block diagram illustrating a structural example of an image display unit according to a first embodiment of the invention.

FIG. 1 illustrates a structural example of an image display unit (liquid crystal display unit 7) according to a first embodiment of the invention. The liquid crystal display unit 7 performs picture display based on a picture signal previously applied with picture signal processing by a picture signal processing unit (picture signal processing unit 4) according to the first embodiment of the invention, and is a hold type display unit. Specifically, the liquid crystal display unit 7 includes the picture signal processing unit 4, a liquid crystal display panel 70, a backlight drive section 71, a backlight 72, a timing controller 73, a gate driver 74, and a data driver 75. Since a picture signal processing method according to the first embodiment of the invention is embodied by the picture signal processing unit 4 of this embodiment, descriptions thereof will be given together.

The picture signal processing unit 4 performs the aftermentioned picture signal processing to a picture signal $D_{in}$ (digital component signal YUV) being previously applied with processing such as channel selection and decoding by a tuner, a decoder or the like (not illustrated), and thereby generates a picture signal $D_{out}$. The detailed structure and the detailed operation of the picture signal processing unit 4 will be described later.

The backlight 72 is a light source that illuminates the liquid crystal display panel 70 with light. For example, the backlight 72 includes a CCFL (Cold Cathode Fluorescent Lamp), an LED (Light Emitting Diode) or the like.

The liquid crystal display panel 70 modulates the illuminated light from the backlight 72 based on the picture signal $D_{out}$ outputted from the picture signal processing unit 4, and thereby performs picture display based on the picture signal $D_{out}$. The liquid crystal display panel 70 includes a transmissive liquid crystal layer (not illustrated), a pair of substrates (a TFT substrate and an opposed electrode substrate: not illustrated) sandwiching the liquid crystal layer, and a polarizing plate (not illustrated) respectively layered on the side opposite to the liquid crystal layer with respect to the TFT substrate and the opposed electrode substrate.

The data driver 75 supplies a drive voltage based on a picture signal to respective pixel electrodes in the liquid crystal display panel 70. The gate driver 74 line-sequentially drives the respective pixel electrodes in the liquid crystal display panel 70 along a horizontal scanning line (not illustrated). The timing controller 73 controls the data driver 75 and the gate driver 74 based on the picture signal $D_{out}$ supplied from the picture signal processing unit 4. The backlight drive section 71 controls lighting operation and extinction operation of the backlight 72 (performs lighting drive of the backlight 72) based on the picture signal $D_{in}$ supplied to the picture signal processing unit 4.
[Structural Example of Picture Signal Processing Unit]

Figure 2:
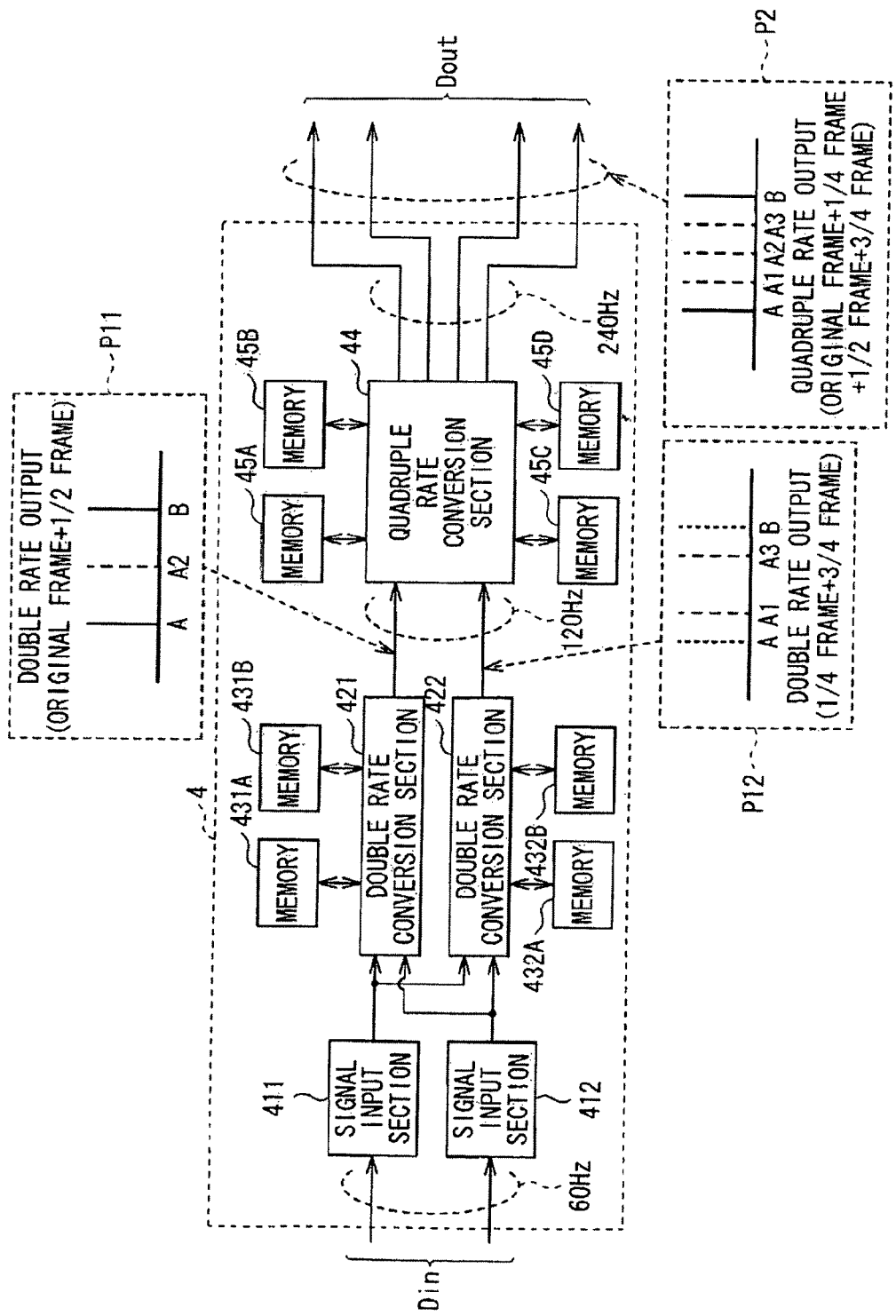
FIG. 2 is a block diagram illustrating a structural example of a picture signal processing unit according to the first embodiment.

Next, a description will be given of the detailed structure of the picture signal processing unit 4 with reference to FIG. 2 and FIG. 3. FIG. 2 illustrates a block configuration of the picture signal processing unit 4.

The picture signal processing unit 4 performs frame rate conversion processing to the picture signal $D_{in}$, and thereby generates the picture signal $D_{out}$ as a quadruple rate picture signal. The picture signal processing unit 4 has two signal input sections 411 and 412, two double rate conversion sections 421 and 422, a pair of memories 431A and 431B, a pair of memories 432A and 432B, one quadruple rate conversion section 44, and four memories 45A to 45D.

The signal input sections 411 and 412 input the picture signal $D_{in}$ (for example, a 60 Hz picture signal), and supply the same to the double rate conversion sections 421 and 422.

The double rate conversion section 421 (first double rate conversion section) performs double rate frame rate conversion, together with the two memories 431A and 431B, by utilizing motion compensation to the picture signal $D_{in}$ supplied from the signal input sections 411 and 412. Specifically, as indicated by referential symbol P11 in the figure, in the picture signal $D_{in}$ corresponding to an original frame, an interpolation frame A2 (first interpolation frame) interpolated between pictures of original frames A and B is added to between the original frames A and B adjacent to each other along time axis by using motion compensation, and thereby double rate frame rate conversion is performed. The interpolation frame A2 is a ½ interpolation frame whose interpolation position is "0.5" between the original frames A and B. Thereby, as indicated by referential symbol P11 in the figure, picture signals corresponding to the original frame A and the interpolation frame A2 (for example, a 120 Hz picture signal) are respectively outputted to the quadruple rate conversion section 44.

The double rate conversion section 422 (second double rate conversion section) also performs double rate frame rate conversion, together with the two memories 432A and 432B, by utilizing motion compensation to the picture signal $D_{in}$ supplied from the signal input sections 411 and 412. Specifically, as indicated by referential symbol P12 in the figure, in the picture signal $D_{in}$ corresponding to the original frame, an interpolation frame A1 (second interpolation frame) and an interpolation frame A3 (third interpolation frame) interpolated between the pictures of the original frames A and B are added to between the original frames A and B adjacent to each other along time axis by using motion compensation, and thereby double rate frame rate conversion is performed. The interpolation frame A1 is a ¼ interpolation frame whose interpolation position is "0.25" between the original frames A and B. The interpolation frame A3 is a ¾ interpolation frame whose interpolation position is "0.75" between the original frames A and B. Thereby, as indicated by the referential symbol P12 in the figure, picture signals corresponding to the interpolation frames A1 and A3 (for example, a 120 Hz picture signal) are respectively outputted to the quadruple rate conversion section 44.

The quadruple rate conversion section 44 performs, together with the four memories 45A to 45D (storage section), quadruple rate frame rate conversion to the picture signal $D_{in}$ by utilizing motion compensation, based on the picture signals corresponding to the original frame A and the interpolation frames A1 to A3 supplied from the double rate conversion sections 421 and 422. Specifically, the memories 45A to 45D respectively store the picture signal $D_{in}$ corresponding to the original frame A and the interpolation picture signals corresponding to the interpolation frames A1 to A3 (the first to the third interpolation picture signals). The quadruple rate conversion section 44 sequentially reads the picture signal $D_{in}$ and the foregoing interpolation picture signals stored in the memories 45A to 45D in a manner of quadruple rate, and thereby performs quadruple rate frame rate conversion for the picture signal $D_{in}$. Thereby, as indicated by referential symbol P2 in the figure, the picture signal $D_{out}$ (for example, 240 Hz picture signal) including the picture signal $D_{in}$ corresponding to the original frame A and the interpolation picture signals corresponding to the interpolation frames A1 to A3 is outputted.

Figure 3:
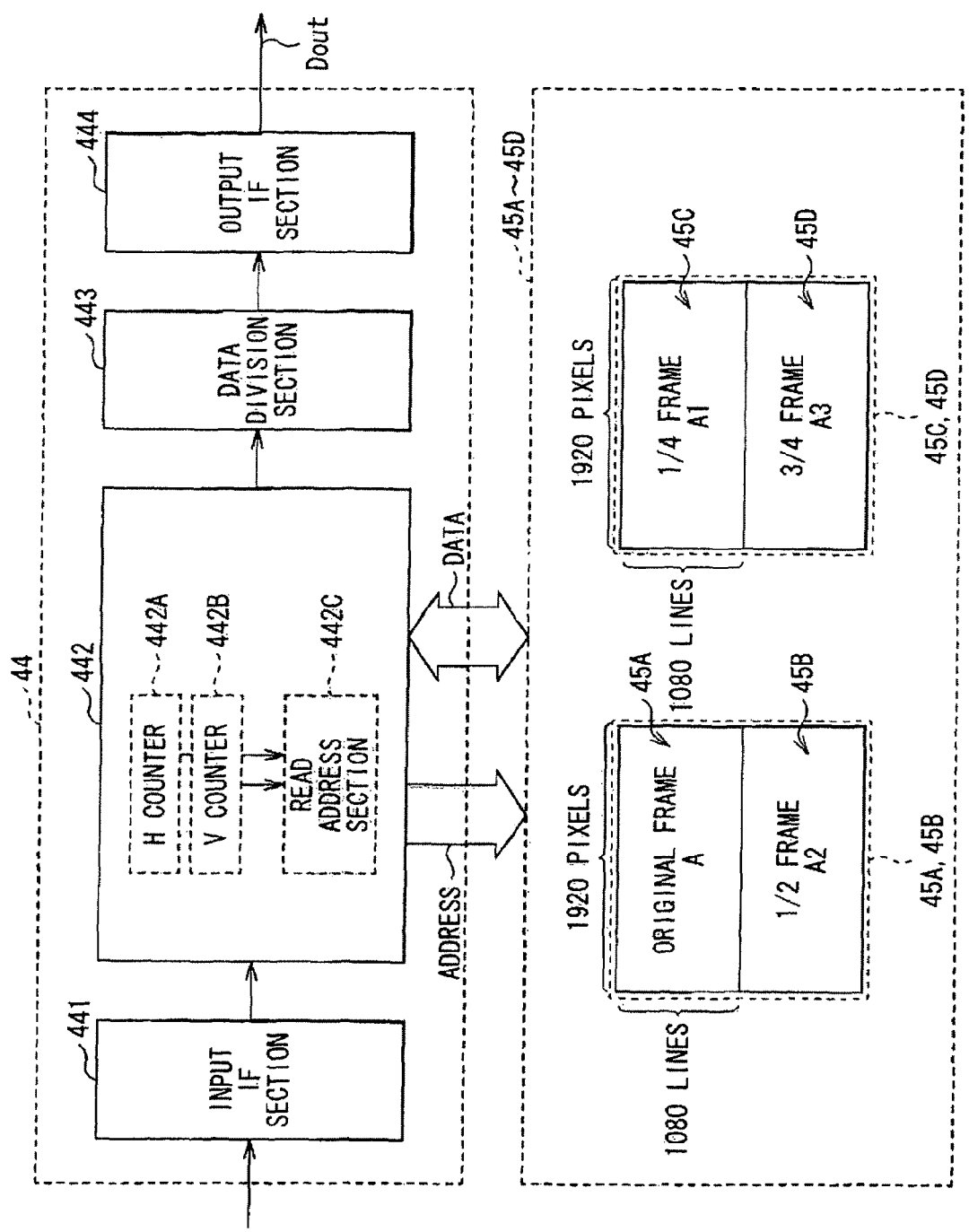
FIG. 3 is a block diagram for explaining a detailed operation of a quadruple rate conversion section and a memory illustrated in FIG. 2.

Further, for example, as illustrated in FIG. 3, the quadruple rate conversion section 44 has an input IF (interface) section 441, a memory controller 442, a data division section 443, and an output IF (interface) section 444.

The input IF section 441 inputs the picture signals corresponding to the original frame A and the interpolation frames A1 to A3 supplied from the double rate conversion sections 421 and 422, and supplies the same to the memory controller 442. The output IF section 444 inputs a picture signal supplied from the after-mentioned data division section 443, and outputs that picture signal as the picture signal $D_{out}$.

As illustrated in FIG. 3, the memory controller 442 supplies the four memories 45A to 45D with addresses (a read address and a write address) of data (picture signal), and inputs/outputs data to/from the memories 45A to 45D. The memory controller 442 includes an H counter 442A, a V counter 442B, and a read address generation section 442C.

The H counter 442A counts the number of pixels in the horizontal direction (H direction) or horizontal pixel position in the effective display screen (effective display screen on the liquid crystal display panel 70) or in the displayed picture, in displaying a picture based on the picture signal $D_{out}$. Since the size of the memories 45A to 45D (size of the frame memories) is 1920 pixels*1080 lines as illustrated in FIG. 3, the count value by the H counter 442A is from 0 to 1919 both inclusive.

The V counter 442B counts the number of frames corresponding to the number of pixels in the vertical direction (V direction) or the vertical pixel position in the foregoing effective display screen or in the displayed picture. As illustrated in FIG. 3, the count value by the V counter 442B is from 0 to 3 both inclusive corresponding to the original frame A and the interpolation frames A1 to A3 (¼ frame A1, ½ frame A2, and ¾ frame A3).

The read address generation section 442C generates the read address in respectively reading the picture signals corresponding to the original frame A and the interpolation frames A1 to A3 from the memories 45A to 45D according to the values of the H counter 442A and the V counter 442B.

As illustrated in FIG. 3, the picture signal $D_{in}$ corresponding to the original frame A is recorded in the memory 45A. The interpolation picture signal corresponding to the ½ frame A2 is recorded in the memory 45B, the interpolation picture signal corresponding to the ¼ frame A1 is recorded in the memory 45C, and the interpolation picture signal corresponding to the ¾ frame A3 is recorded in the memory 45D. That is, four frames, that is, the original frame A and the interpolation frames A1 to A3 are stored in each separate memory, and is able to be read at random. Though the details will be described later, in this embodiment, the read address generated by the read address generation section 442C is changed as needed according to the values of the H counter 442A and the V counter 442B.

The data division section 443 divides the picture signals corresponding to the original frame A and the interpolation frames A1 to A3 supplied from the memory controller 442 into each of a plurality of controllers in the timing controller 73, for example.

[Explanation of Operation]

Next, a description will be given of action and effect of the liquid crystal display unit 7 of this embodiment with reference to FIG. 1 to FIG. 4C.

In the liquid crystal display unit 7, as illustrated in FIG. 1, the picture signal $D_{in}$ supplied from outside is frame-rate converted and the picture signal $D_{out}$ is generated in the picture signal processing unit 4. The picture signal $D_{out}$ is supplied through the timing controller 73 to the data driver 75. In the data driver 75, D/A conversion is applied to the picture signal $D_{out}$, and a picture signal as an analog signal is generated. Based on that picture signal, display drive operation for every pixel is performed by the drive voltage to each pixel in the liquid crystal display panel 70 outputted from the gate driver 74 and the data driver 75.

In each pixel, illuminated light from the backlight 72 is modulated in the liquid crystal display panel 70, and is outputted as display light. Thereby, picture display based on the picture signal $D_{in}$ is performed in the liquid crystal display unit 7.

At this time, in the picture signal processing unit 4, as illustrated in FIG. 2, double rate frame rate conversion by utilizing the motion compensation is performed to the picture signal $D_{in}$ in the double rate conversion section 421 and the memories 431A and 431B, and the picture signals corresponding to the original frame A and the interpolation frame A2 are respectively outputted to the quadruple rate conversion section 44. Further, the double rate frame rate conversion by utilizing the motion compensation is performed to the picture signal $D_{in}$ in the double rate conversion section 422 and the memories 432A and 432B, and the picture signals corresponding to the interpolation frames A1 and A3 are respectively outputted to the quadruple rate conversion section 44. In addition, the picture signal $D_{in}$ corresponding to the original frame A and the interpolation picture signals corresponding to the interpolation frames A1 to A3 are respectively stored in the memories 45A to 45D, and those picture signals are sequentially read by the quadruple rate conversion section 44 in a manner of quadruple rate. Thereby, in the quadruple rate conversion section 44 and the memories 45A to 45D, the quadruple rate frame rate conversion using the motion compensation for the picture signal $D_{in}$ is performed, and the picture signal $D_{out}$ including the picture signal $D_{in}$ corresponding to the original frame A and the interpolation picture signals corresponding to the interpolation frames A1 to A3 is generated.

Accordingly, after the double rate frame rate conversion for the picture signal $D_{in}$ is performed respectively and separately in the two paths, the quadruple rate frame rate conversion for the picture signal $D_{in}$ is performed. Therefore, compared to a case in which the quadruple rate frame rate conversion is performed directly to the picture signal $D_{in}$ (for example, the after-mentioned picture signal processing unit 5 of the second embodiment), the quadruple rate frame rate conversion is realized with a simple structure.

Further, at this time, in the quadruple rate conversion section 44 and the memories 45A to 45D, as illustrated in FIG. 3, the four frames, that is, the original frame A and the interpolation frames A1 to A3 are stored in each separate memory, and is able to be read at random. In addition, the read address generated by the read address generation section 442C is switched as needed according to the values of the H counter 442A and the V counter 442B.

Therefore, in this embodiment, as illustrated in FIG. 4A to FIG. 4C for example, a demonstration mode for allowing a customer to feel a display image quality difference between a display picture by quadruple rate and a display picture by double rate (demonstration screen simultaneously displaying the display picture by quadruple rate and the display picture by double rate) is realized. In this embodiment, a 60 Hz or 50 Hz picture signal is taken as a normal rate example, a 120 Hz or 100 Hz picture signal is taken as a double rate example, and a 240 Hz or 200 Hz picture signal is taken as a quadruple rate example.

Specifically, first, for example, in the demonstration mode illustrated in FIG. 4A, the liquid crystal display panel (display screen) 70 is divided into a screen on the left viewed from a consumer (left screen) 70L and a screen on the right viewed from a consumer (right screen) 70R. The picture display by quadruple rate is performed in the left screen 70L and the picture display by double rate is performed in the right screen 70R, and motion telop, horizontal camera pan and the like are displayed.

At this time, the read address generation section 442C generates the read address so that the picture signals corresponding to the original frame A and the interpolation frames A1 to A3 are periodically read, for example, in the order illustrated in the left table in FIG. 4C. Specifically, in the case where the value of the H counter 422A is under a given threshold value (960) (from 0 to 959 both inclusive, left screen 70L), the read address generation section 442C generates the read address so that the picture signals corresponding to the original frame A, the ¼ frame A1, the ½ frame A2, and the ¾ frame A3 are periodically read in this order as the value of the V counter 442B (the number of frames) is increased (A→A1→A2→A3). On the other hand, in the case where the value of the H counter 422A is the foregoing threshold value (960) or more (from 960 to 1919 both inclusive, right screen 70R), the read address generation section 442C generates the read address so that the picture signals corresponding to the original frame A and the ½ frame A2 are periodically read in this order as the value of the V counter 442B (the number of frames) is increased (A→A→A2→A2). Accordingly, the picture signals of the interpolation frames read at the position of the ¼ frame and the position of the ¾ frame for the left screen 70L are different from those for the right screen 70R, and thereby the demonstration screen simultaneously displaying the display picture by quadruple rate and the display screen by double rate is realized.

Further, for example, in the demonstration mode illustrated in FIG. 4B, the liquid crystal display panel (display screen) 70 is divided into the left screen 70L, a central screen 70C, and the right screen 70R. The picture display by quadruple rate is performed in the left screen 70L, the picture display by double rate is performed in the central screen 70C, and picture display by normal rate is performed in the right screen 70R, and motion telop, horizontal camera pan and the like are displayed.

At this time, the read address generation section 442C generates the read address so that the picture signals corresponding to the original frame A and the interpolation frames A1 to A3 are periodically read, for example, in the order illustrated in the right table in FIG. 4C. Specifically, in the case where the value of the H counter 442A is under a given first threshold value (640) (from 0 to 639 both inclusive, left screen 70L), the read address generation section 442C generates the read address so that the picture signals corresponding to the original frame A, the ¼ frame A1, the ½ frame A2, and the ¾ frame A3 are periodically read in this order as the value of the V counter 442B (the number of frames) is increased (A→A1→A2→A3). In addition, in the case where the value of the H counter 442A is equal to or more than the foregoing first threshold value (640) and less than a second threshold value (1280) (from 640 to 1279 both inclusive, central screen 70C), the read address generation section 442C generates the read address so that the picture signals corresponding to the original frame A and the ½ frame A2 are periodically read in this order as the value of the V counter 442B (the number of frames) is increased (A→A→A2→A2). Further, in the case where the value of the H counter 422A is equal to or more than the foregoing second threshold value (1280) (from 1280 to 1919 both inclusive, right screen 70R), the read address generation section 442C generates the read address so that only the picture signal $D_{in}$ corresponding to the original frame A is read without depending on the value of the V counter 442B (the number of frames) (A→A→A→A). Accordingly, the picture signals of the interpolation frames read at the position of the ¼ frame, the position of ½ frame, and the position of the ¾ frame in the left screen 70L are changed or different in the central screen 70C and in the right screen 70R, and thereby the demonstration screen simultaneously displaying the display picture by quadruple rate, the display screen by double rate, and the display screen by normal rate is realized.

Figure 14A:
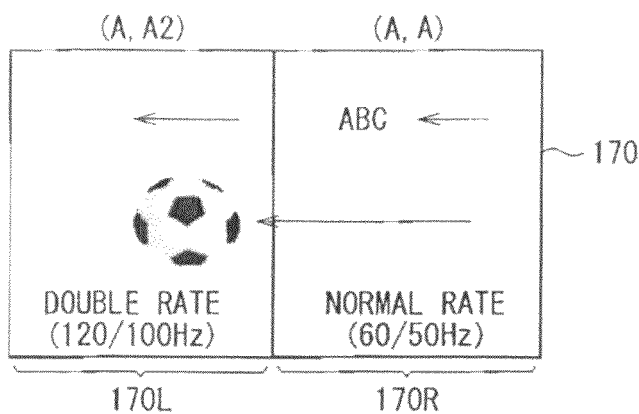
FIGS. 14A and 14B are diagrams for explaining an example of a demonstration mode in displaying a picture by double rate or quadruple rate.
Figure 14B:
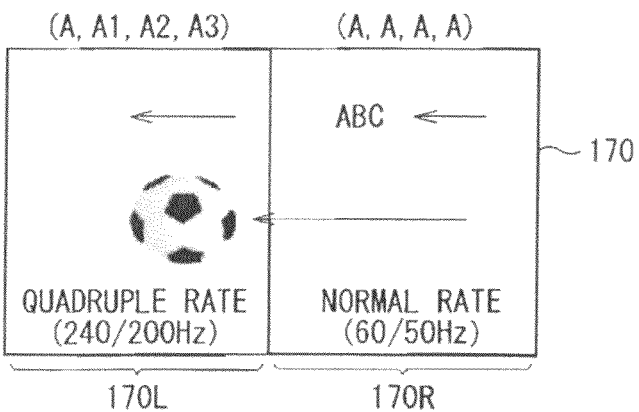

Accordingly, in this embodiment, as illustrated in FIGS. 4A and 4B, the read address is switched as needed according to the values of the H counter 442A and the V counter 442B. Thereby, unlike the demonstration mode (comparative example) illustrated in FIG. 14B, the picture signal $D_{out}$ in which the display picture by quadruple rate and the display screen by double rate are simultaneously displayed in the display screen is able to be generated.

Accordingly, in this embodiment, after the double rate frame rate conversion for the picture signal $D_{in}$ is performed respectively and separately in the two paths, the quadruple rate frame rate conversion for the picture signal $D_{in}$ is performed. Thus, compared to a case in which the quadruple frame rate conversion is directly performed for the picture signal $D_{in}$, the quadruple rate frame rate conversion is realized with a simple structure. Therefore, the quadruple rate frame rate conversion for the picture signal $D_{in}$ is able to be performed while the manufacturing cost is kept low. Further, compared to the case in which the quadruple rate frame rate conversion is directly performed for the picture signal $D_{in}$, the power consumption is also able to be kept low.

Further, in this embodiment, the read address is changed as needed according to the values of the H counter 442A and the V counter 442B. Thus, the picture signal $D_{out}$ in which the display picture by double rate and the display screen by quadruple rate are simultaneously displayed in the display screen is able to be generated. Therefore, an output picture signal capable of effectively allowing a customer to feel the display image quality difference between the display picture by double rate and the display picture by quadruple rate is able to be generated. Thereby, through telop and a dynamic screen, the difference between the quadruple rate and the double rate is able to be demonstrated to consumers at shops, leading to promotion of quadruple rate TV sets.

Figure 5:
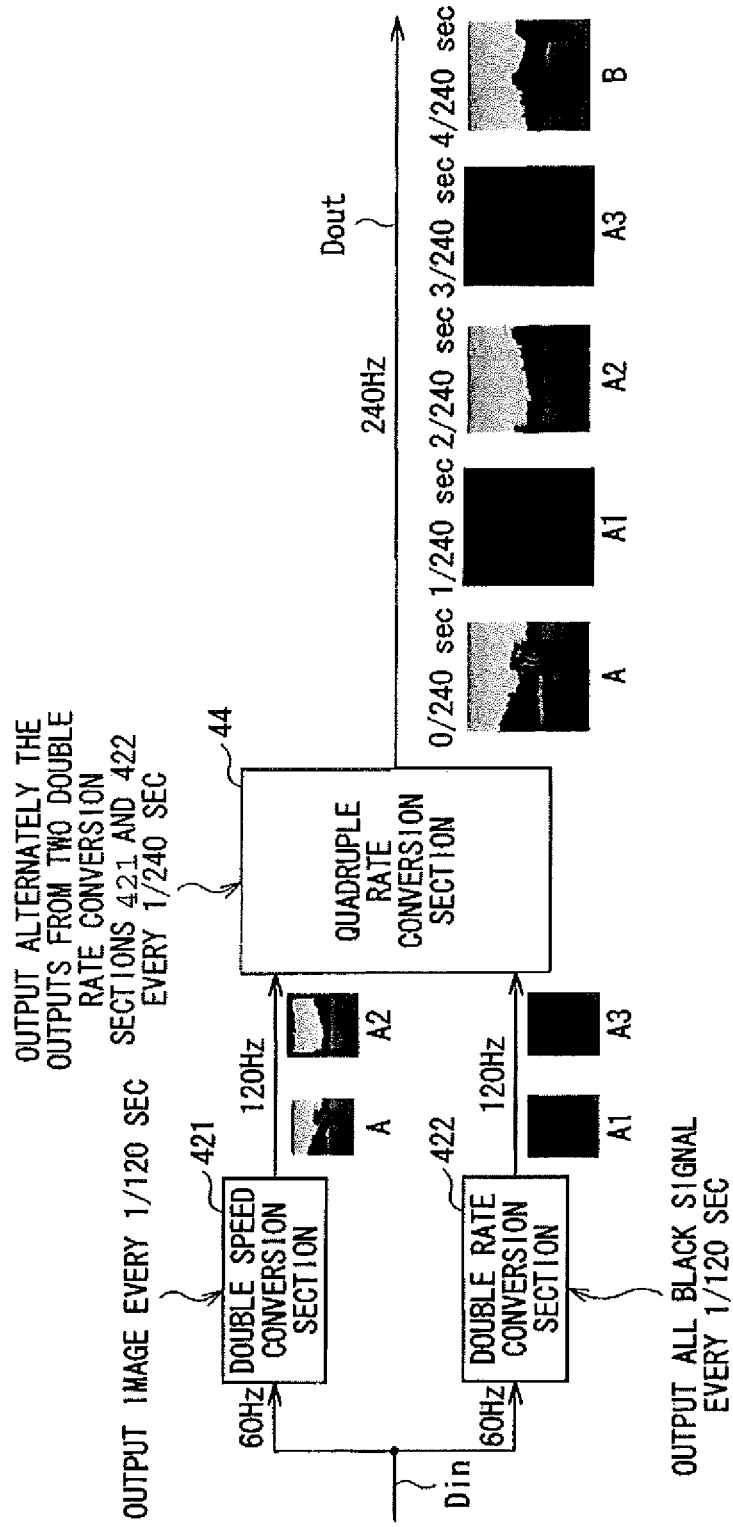
FIG. 5 is a block diagram for explaining an implementation example of black insertion processing by a double rate conversion section and the quadruple rate conversion section illustrated in FIG. 2.

In the picture signal processing unit 4 of this embodiment, for example, as illustrated in FIG. 5, one of the double rate conversion sections 421 and 422 (in this case, the double rate conversion section 422) may output a picture signal corresponding to black display (interpolation picture signal), and thereby black insertion processing may be performed in the picture signal $D_{out}$. Specifically, in this case, the double rate conversion sections 421 respectively outputs the normal display picture signals corresponding to the original frame A and the interpolation frame A2, and the double rate conversion section 422 respectively outputs the black display picture signals corresponding to the interpolation frames A1 and A3. According to this configuration, the black insertion processing in the picture signal $D_{out}$ corresponding to quadruple rate (for example, a 240 Hz picture signal) is realized, and hold-type blurring in picture display in the liquid crystal display panel 70 as a hold type display panel is able to be improved. Further, compared to the black insertion processing in the case of 120 Hz, flicker is able to be hardly viewed.

2. Second Embodiment

[Structural Example of Picture Signal Processing Unit]

Next, a description will be given of the second embodiment of the invention. For the same elements as those of the foregoing first embodiment, the same referential symbols are affixed thereto, and the description thereof will not be described in detail. In this embodiment, for each frame signal stored in a memory, Prev (a previous frame signal) and Succ (current frame signal) are simultaneously read in a quadruple rate, and interpolation is subsequently performed to generate a quadruple rate picture signal. That is, unlike the first embodiment, quadruple rate frame rate conversion is directly performed for the picture signal $D_{in}$.

Figure 6:
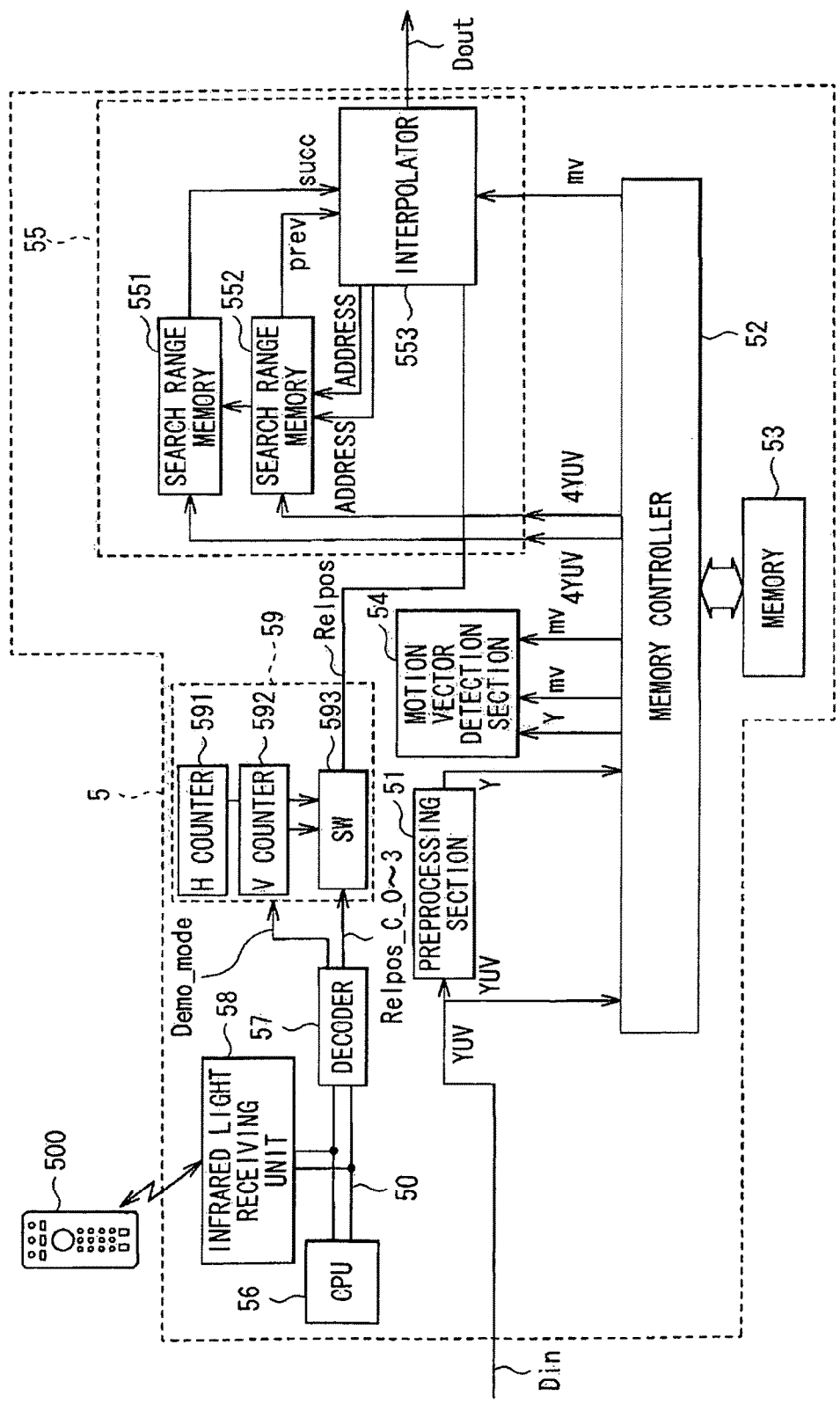
FIG. 6 is a block diagram illustrating a structural example of a picture signal processing unit according to a second embodiment.

FIG. 6 is a block diagram illustrating a structural example of the picture signal processing unit (picture signal processing unit 5) according to this embodiment. The picture signal processing unit 5 is built in a television receiver (corresponding to the liquid crystal display unit 7), and a picture signal $D_{in}$ (digital component signal YUV) being previously applied with processing such as channel selection and decoding by a tuner, a decoder or the like is inputted thereto. Since a picture signal processing method according to the second embodiment of the invention is embodied by the picture signal processing unit 5 according to this embodiment, descriptions thereof will be given together.

The picture signal processing unit 5 has a preprocessing section 51, a memory controller 52, a memory 53, a motion vector detection section 54, an interpolation section (quadruple rate conversion section) 55, a CPU (Central Processing Unit) 56, a decoder 57, an infrared light receiving unit 58, and an interpolation position parameter switch section 59 (parameter switch section). In the picture signal processing unit 5, in the picture signal $D_{in}$, interpolation frames A1 to A3 are added to between original frames A and B adjacent to each other along time axis by utilizing motion compensation, and thereby performing quadruple rate frame rate conversion to the picture signal $D_{in}$. Thus, a picture signal $D_{out}$ including the picture signal $D_{in}$ corresponding to the original frame A and interpolation picture signals corresponding to the interpolation frames A1 to A3 is generated.

The digital component signal YUV supplied to the picture signal processing unit 5 is inputted to the preprocessing section 51, and is sequentially written into the memory 53 through the memory controller 52.

In the preprocessing section 51, processing for separating a luminance signal Y from the digital component signal YUV is performed. The luminance signal Y separated in the preprocessing section 51 is also sequentially written into the memory 53 through the memory controller 52.

The luminance signal Y written into the memory 53 is sequentially read by the memory controller 52 (in the case of a film signal in which the same original frame is repeated twice or three times, the same original frame is read only once), and is sent to the motion vector detection section 54. In the motion vector detection section 54, by using the luminance signal Y of the current frame and the luminance signals Y of the previous and subsequent frames, motion vector detection processing by block matching is performed.

A motion vector "mv" of each frame detected by the motion vector detection section 54 is written into the memory 53 through the memory controller 52 and is then read from the memory 53, and is sent again to the vector detection section 54 for reference in motion vector detection of the next frame.

Further, the memory controller 52 reads four system portions of the digital component signals YUV written into the memory 53 that are shifted from each other by one frame portion in a manner of quadruple rate (in the case of a film signal in which the same original frame is repeated twice or three times, the same original frame is read only once). Further, the memory controller 52 reads the motion vector mv expressing motion between the two frames in a manner of quadruple rate. The four system portions of the digital component signals "4YUV" and the vector mv read as above are sent to the interpolation section 55.

The interpolation section 55 is provided with search range memories 551 and 552 for four system portions (2 system portions by two), and an interpolator 553. The four system portions of the digital component signals 4YUV from the memory controller 52 is divided into two system portions and the other two system portions, which are respectively and separately written into the search range memories 551 and 552. The motion vector mv from the memory controller 52 is inputted to the interpolator 553.

Further, a demonstration mode switch signal "Demo_mode" and interpolation position parameters "Relpos_C_0"~"Relpos_C_3" indicating an interpolation position of a picture in an interpolation frame are supplied from the CPU 56 to the interpolation position parameter switch section 59 through an I²C bus 50 as a serial bus and the decoder 57 that parallel-converts a serial signal. For the details of the interpolation position parameter Relpos, a description will be given later.

The interpolation position parameter switch section 59 has an H counter 591, a V counter 592, and a SW (switch) 593.

The H counter 591 counts the number of pixels in the horizontal direction (H direction) or the horizontal pixel position in the effective display screen (effective display screen on the liquid crystal display panel 70) or in the displayed picture in performing a picture display based on the picture signal $D_{out}$. In this embodiment, the count value by the H counter 591 is from 0 to 1919 both inclusive as that of the H counter 442A in the first embodiment.

The V counter 592 counts the number of frames corresponding to the number of pixels in the vertical direction (V direction) or the vertical pixel position in the foregoing effective display screen or in the displayed picture. In this embodiment, the count value by the V counter 592 is from 0 to 3 both inclusive as that of the V counter 442B in the first embodiment.

The SW 593 selects one of the four interpolation position parameters (Relpos_C_0~Relpos_C_3) including the interpolation position parameter (Relpos_C_0) corresponding to the original frame A and the interpolation position parameters (Relpos_C_1~Relpos_C_3) corresponding to the interpolation frames A1 to A3, and outputs the same according to the values of the H counter 591 and the V counter 592. Further, such selection of the interpolation position parameter is able to be switched as needed according to the value of the demonstration mode switch signal Demo_mode. The interpolation position parameter selected as above is outputted to the interpolator 553 in the interpolation section 55 as an interpolation position parameter Relpos. The value of the demonstration mode switch signal Demo_mode is able to be set, for example, through the infrared light receiving unit 58 by a remote controller 500.

The interpolator 553 performs a given address calculation based on the motion vector mv and the interpolation position parameter Relpos supplied from the interpolation position parameter switch section 59. Specifically, the interpolator 553 calculates addresses of pixels of the original frames in the search range memories 551 and 552 used for calculating a pixel value of an interpolation frame based on the motion vector mv and the interpolation position parameter Relpos. Here, a module (not illustrated) for obtaining an accurate vector from the detected motion vector mv may be provided between the memory controller 52 and the interpolator 553.

Figures 7, 8:
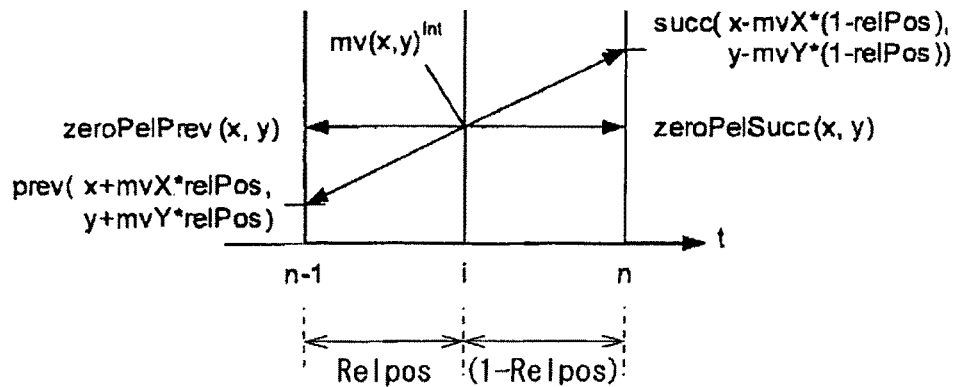
FIG. 7 is a diagram for explaining a principle of address calculation by an interpolator illustrated in FIG. 6.
FIG. 8 is a diagram for explaining an interpolation position parameter supplied by a CPU illustrated in FIG. 6.

FIG. 7 conceptually illustrates principles of the address calculation by the interpolator 553.

In FIG. 7, n−1 indicates an address (positions in x direction and y direction on the screen) in the vertical axis direction of each pixel of the earlier original frame out of the two original frames that are shifted from each other by one frame portion written in the search range memories 551 and 552. In addition, "n" indicates an address in the vertical direction of each pixel of the later original frame out of the two original frames.

Figure 12:
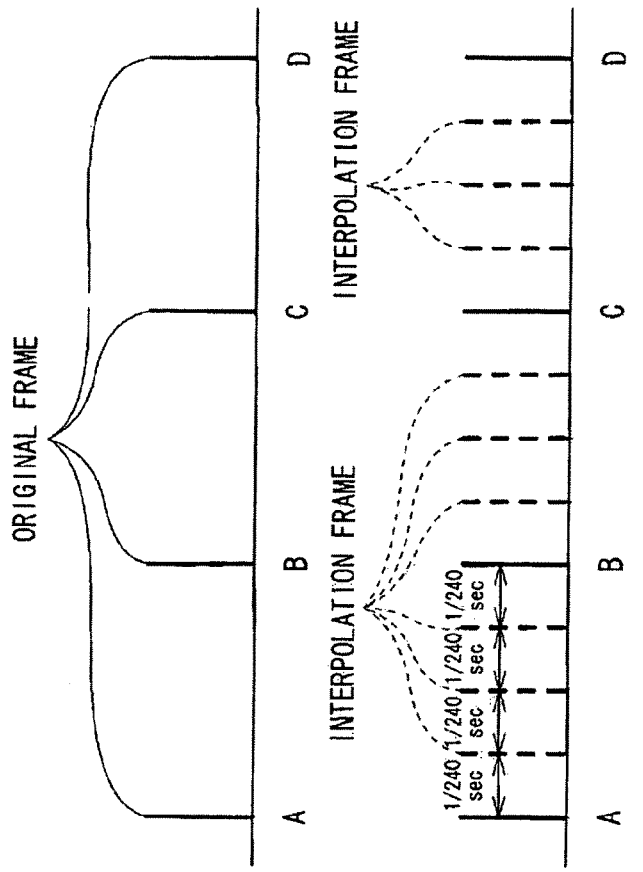
FIGS. 12A and 12B are timing charts for explaining a principle and an interpolation position of frame rate conversion (quadruple rate conversion) of a camera signal.
Figure 13:
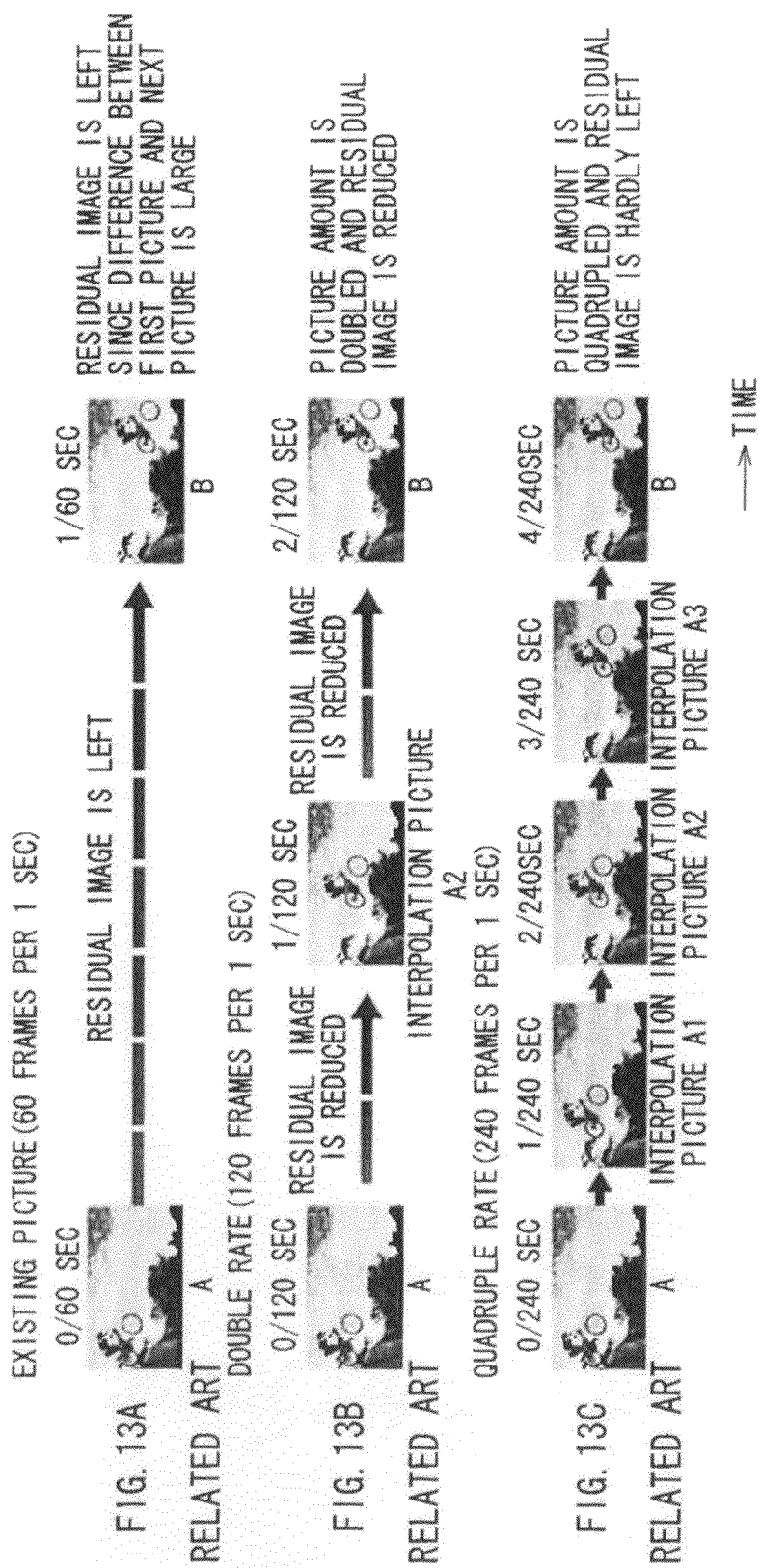
FIGS. 13A to 13C are timing charts for explaining a relation between a picture by normal rate/double rate/quadruple rate and persistence of vision.

Also, "i" indicates an address of each pixel of the interpolation frame in the vertical axis direction. The horizontal axis represents time, and indicates timing of the interpolation frame i between the original frames n−1 and n (in this case, as an example, timing corresponding to the central interpolation frame out of the three interpolation frames in FIG. 12B). "Relpos" is an interpolation position parameter supplied for creating the interpolation frame i.

mv(x, y)int is the motion vector mv between the original frames n−1 and n for an address (x, y) of a pixel to be currently generated (referred to as a referential pixel) out of each pixel of the interpolation frame i. "zeroPelPrev(x, y)" is a value of the pixel of the referential address (x, y) in the original frame n−1. "zeroPelSucc(x, y)" is a value of the pixel of the referential address (x, y) in the original frame n.

The interpolator 553 obtains an address of a pixel based on the referential address (x, y), on x-direction element "mvX" of the motion vector mv(x, y)int, on y-direction element "mvY" of the motion vector mv(x, y)int, and on the interpolation position parameter Relpos. Specifically, the interpolator 553 obtains an address of a pixel of the original frames n−1 and n used for calculating the pixel value of the referential address (x, y) by using the following calculating formula (1) based on the referential address (x, y), the x-direction element "mvX" of the motion vector mv(x, y)int, the y-direction element "mvY" of the motion vector mv(x, y)int, and the interpolation position parameter Relpos.

[CALCULATING FORMULA 1]

$$\text{Address of pixel of original frame } n-1 = \quad (1)$$
$$(x + mvx \cdot Relpos, y + mvx \cdot Relpos)$$
$$\text{Address of pixel of original frame } n =$$
$$(x - mvx \cdot (1 - Relpos), y - mvY \cdot (1 - Relpos))$$

Further, the interpolator 553 sends the thus obtained addresses to the search range memories 551 and 552, and reads pixel values "prev" and "succ" of these addresses. Further, the interpolator 553 calculates a pixel value "Out" of the referential address (x, y) of the interpolation frame i by using the following calculating formula (2) by using the pixel values prev and succ and the interpolation position parameter Relpos.

[CALCULATING FORMULA 2]

$$Out = prev \cdot (1 - Relpos) + succ \cdot Relpos \quad (2)$$

The foregoing calculation is sequentially performed for each pixel of the interpolation frame i (calculation is performed by sequentially updating the value of the referential address (x, y)), and thereby the interpolation frame i is generated.

Next, a description will be given of the interpolation position parameters Relpos_C_0~Relpos_C_3 supplied from the CPU 56. FIG. 8 illustrates a relationship between the interpolation position parameters Relpos_C_0~Relpos_C_3 supplied from the CPU 56 and set values of the interpolation positions.

As illustrated in FIG. 8, the set value of the interpolation position corresponding to the interpolation position parameter Relpos_C_0 is "0" (corresponding to the original frame A). The set values of the interpolation positions corresponding to the interpolation position parameters Relpos_C_1 to Relpos_C_3 are respectively "0.25", "0.5", and "0.75" (corresponding to the interpolation frames A1 to A3).

[Explanation of Operation]

Next, a description will be given of action and effect of an image display unit (corresponding to the liquid crystal display unit 7 of the first embodiment) provided with the picture signal processing unit 5 of this embodiment with reference to FIG. 6 to FIG. 9C. The basic operation of the whole image display unit is similar to that of the first embodiment, and thus the description thereof will not be given in detail.

In the picture signal processing unit 5 of this embodiment, as illustrated in FIG. 6, in the picture signal $D_{in}$, the interpolation frames A1 to A3 are respectively added to between the original frames A and B adjacent to each other along time axis by utilizing the motion compensation, and thereby the quadruple rate frame rate conversion is performed to the picture signal $D_{in}$. Thereby, the picture signal $D_{out}$ including the picture signal $D_{in}$ corresponding to the original frame A and the interpolation picture signals corresponding to the interpolation frames A1 to A3 is generated.

At this time, in the interpolation position parameter switch section 59, as illustrated in FIG. 7 and FIG. 8, one of the four interpolation position parameters (Relpos_C_0~Relpos_C_3) including the interpolation position parameter (Relpos_C_0) corresponding to the original frame A and the interpolation position parameters (Relpos_C_1~Relpos_C_3) corresponding to the interpolation frames A1 to A3 is selected, switched as needed, outputted according to the values of the H counter 591 and the V counter 592, and used in the quadruple rate frame rate conversion.

Therefore, as illustrated in FIG. 9A to FIG. 9C for example, the demonstration mode for allowing a customer to feel the display image quality difference between the display picture by quadruple rate and the display picture by double rate (demonstration screen simultaneously displaying the display picture by quadruple rate and the display picture by double rate) is also realized in this embodiment. Here, as in the first embodiment, a 60 Hz or 50 Hz picture signal is taken as a normal rate example, a 120 Hz or 100 Hz picture signal is taken as a double rate example, and a 240 Hz or 200 Hz picture signal is taken as a quadruple rate example.

Specifically, first, for example, in the demonstration mode illustrated in FIG. 9A, the liquid crystal display panel (display screen) 70 is divided into the left screen 70L and the right screen 70R. Picture display by quadruple rate is performed in the left screen 70L, picture display by double rate is performed in the right screen 70R, and motion telop, horizontal camera pan and the like are displayed.

At this time, the interpolation position parameter switch section 59 selectively outputs one of the interpolation position parameters Relpos_C_0~Relpos_C_3 so that the interpolation position parameters Relpos_C_0~Relpos_C_3 are periodically switched, for example, in the order illustrated in the left table in FIG. 9C. Specifically, in the case where the value of the H counter 591 is under a given threshold value (960) (from 0 to 959 both inclusive, left screen 70L), the interpolation position parameter switch section 59 selectively outputs one of the interpolation position parameters Relpos_C_0~Relpos_C_3 so that the value of the interpolation position parameter Relpos is periodically switched in the order of "0", "0.25", "0.5", and "0.75" ("0"→"0.25"→"0.5"→"0.75") as the value of the V counter 592 (the number of frames) is increased. On the other hand, in the case where the value of the H counter 591 is equal to or more than the foregoing threshold value (960) (from 960 to 1919 both inclusive, right screen 70R), the interpolation position parameter switch section 59 selectively outputs one of the interpolation position parameters Relpos_C_0~Relpos_C_3 so that the value of the interpolation position parameter Relpos is periodically switched in the order of "0" and "0.5" ("0"→"0"→"0.5"→"0.5"), as the value of the V counter 592 (the number of frames) is increased. Accordingly, the values of the interpolation parameters when the values of the V counter 592 is 1 and 3 in the left screen 70L are changed in the right screen 70R, and thereby the demonstration screen simultaneously displaying the display picture by quadruple rate display picture and the display screen by double rate display is realized.

Further, in the demonstration mode illustrated in FIG. 9B, the liquid crystal display panel (display screen) 70 is divided into the left screen 70L, the central screen 70C, and the right screen 70R. The picture display by quadruple rate is performed in the left screen 70L, the picture display by double rate is performed in the central screen 70C, picture display by normal rate is performed in the right screen 70R, and motion telop, horizontal camera pan and the like are displayed.

At this time, the interpolation position parameter switch section 59 selectively outputs one of the interpolation position parameters Relpos_C_0—Relpos_C_3 so that the interpolation position parameters Relpos_C_0~Relpos_C_3 are periodically switched, for example, in the order illustrated in the right table in FIG. 9C. Specifically, in the case where the value of the H counter 591 is under a given first threshold value (640) (from 0 to 639 both inclusive, left screen 70L), the interpolation position parameter switch section 59 selectively outputs one of the interpolation position parameters Relpos_C_0~Relpos_C_3 so that the value of the interpolation position parameter Relpos is periodically switched in the order of "0", "0.25", "0.5", and "0.75" ("0"→"0.25"→"0.5"→"0.75"), as the value of the V counter 592 (the number of frames) is increased. In addition, in the case where the value of the H counter 591 is equal to or more than the foregoing first threshold value (640) and under a given second threshold value (1280) (from 640 to 1279 both inclusive, central screen 70C), the interpolation position parameter switch section 59 selectively outputs one of the interpolation position parameters Relpos_C_0~Relpos_C_3 so that the value of the interpolation position parameter Relpos is periodically switched in the order of "0" and "0.5" ("0"→"0"→"0.5"→"0.5"), as the value of the V counter 592 (the number of frames) is increased. Further, in the case where the value of the H counter 591 is equal to or more than the foregoing second threshold value (1280) (from 1280 to 1919 both inclusive, right screen 70R), the interpolation position parameter switch section 59 outputs the value of the interpolation position parameters Relpos as "0" without depending on the value of the V counter 592 (the number of frames) ("0"→"0"→"0"→"0"). Accordingly, the values of the interpolation parameters when the values of the V counter 592 is any of 1 to 3 in the left screen 70L are changed or different in the central screen 70C and the right screen 70R, and thereby the demonstration screen simultaneously displaying the display picture by quadruple rate, the display screen by double rate, and the display screen by normal rate is realized.

Therefore, in this embodiment, as illustrated in FIGS. 9A and 9B, one of the four interpolation position parameters (Relpos_C_0~Relpos_C_3) is selected, switched as needed, and outputted according to the values of the H counter 591 and the V counter 592. Thereby, as in the first embodiment, unlike the demonstration mode (comparative example) illustrated in FIG. 14B, the picture signal $D_{out}$ in which the display picture by double rate and the display screen by quadruple rate are simultaneously displayed in the display screen is able to be generated.

As described above, in this embodiment, the quadruple rate frame rate conversion is performed to the picture signal $D_{in}$, and the picture signal $D_{out}$ including the picture signal $D_{in}$ and the interpolation picture signals is outputted. In addition, one of the four interpolation position parameters (Relpos_C_0~Relpos_C_3) is selected, switched as needed, and outputted according to the values of the H counter 591 and the V counter 592. Thus, the picture signal $D_{out}$ in which the display picture by double rate and the display screen by quadruple rate are simultaneously displayed in the display screen is able to be generated. Accordingly, as in the first embodiment, the picture signal $D_{out}$ capable of effectively demonstrating the display image quality difference between the display picture by double rate and the display picture by quadruple rate is able to be generated. Therefore, as in the first embodiment, through telop and a dynamic screen, the difference between quadruple rate and double rate is able to be demonstrated to consumers at shops, leading to promotion of quadruple rate TV sets.

Further, since the quadruple rate frame rate conversion is directly performed for the picture signal $D_{in}$, the chip area is able to be decreased as compared to the first embodiment, and the size of the unit is able to be decreased.

3. MODIFIED EXAMPLE

While the invention has been described with reference to the first and the second embodiments, the invention is not limited to these embodiments, and various modifications may be made.

For example, in the demonstration mode (FIG. 4A) illustrated in the foregoing first embodiment, on the contrary, the picture display by double rate may be performed in the left screen 70L, and the picture display by quadruple rate may be performed in the right screen 70R. In this case, in the case where the value of the H counter 422A is under the given threshold value (960) (from 0 to 959 both inclusive, left screen 70L), the read address generation section 442C generates the read address so that the picture signals corresponding to the original frame A and the ½ frame A2 are periodically read in this order, as the value of the V counter 442B (the number of frames) is increased (A→A→A2→A2). On the other hand, in the case where the value of the H counter 422A is equal to or more than the foregoing threshold value (960) (from 960 to 1919 both inclusive, right screen 70R), the read address generation section 442C generates the read address so that the picture signals corresponding to the original frame A, the ¼ frame A1, the ½ frame A2, and the ¾ frame A3 are periodically read in this order, as the value of the V counter 442B (the number of frames) is increased (A→A1→A2→A3).

Further, in the demonstration mode (FIG. 4B) illustrated in the foregoing first embodiment, on the contrary, the picture display by double rate may be performed in the left screen 70L, and the picture display by quadruple rate may be performed in the right screen 70R. In this case, in the case where the value of the H counter 422A is under the given first threshold value (640) (from 0 to 639 both inclusive, left screen 70L), the read address generation section 442C generates the read address so that only the picture signal $D_{in}$ corresponding to the original frame A is read, without depending on the value of the V counter 442B (the number of frames) (A→A→A→A). On the other hand, in the case where the value of the H counter 422A is equal to or more than the foregoing second threshold value (1280) (from 1280 to 1919 both inclusive, right screen 70R), the read address generation section 442C generates the read address so that the picture signals corresponding to the original frame A, the ¼ frame A1, the ½ frame A2, and the ¾ frame A3 are periodically read in this order, as the value of the V counter 442B (the number of frames) is increased (A→A1→A2→A3).

Further, in the demonstration mode (FIG. 9A) illustrated in the foregoing second embodiment, on the contrary, the picture display by double rate may be performed in the left screen 70L, and the picture display by quadruple rate may be performed in the right screen 70R. In this case, in the case where the value of the H counter 591 is under the given threshold value (960) (from 0 to 959 both inclusive, left screen 70L), the interpolation position parameter switch section 59 selectively outputs one of the interpolation position parameters Relpos_C_0~Relpos_C_3 so that the value of the interpolation position parameter Relpos is periodically switched in the order of "0" and "0.5" ("0"→"0"→"0.5"→"0.5") as the value of the V counter 592 (the number of frames) is increased. On the other hand, in the case where the value of the H counter 591 is equal to or more than the foregoing threshold value (960) (from 960 to 1919 both inclusive, right screen 70R), the interpolation position parameter switch section 59 selectively outputs one of the interpolation position parameters Relpos_C_0~Relpos_C_3 so that the value of the interpolation position parameter Relpos is periodically switched in the order of "0", "0.25", "0.5", and "0.75" ("0"→"0.25"→"0.5"→"0.75"), as the value of the V counter 592 (the number of frames) is increased.

Further, in the demonstration mode (FIG. 9B) illustrated in the foregoing second embodiment, on the contrary, the picture display by double rate may be performed in the left screen 70L, and the picture display by quadruple rate may be performed in the right screen 70R. In this case, in the case where the value of the H counter 591 is under the given first threshold value (640) (from 0 to 639 both inclusive, left screen 70L), the interpolation position parameter switch section 59 outputs the value of the interpolation position parameters Relpos as "0", without depending on the value of the V counter 592 (the number of frames) ("0"→"0"→"0"→"0"). Further, in the case where the value of the H counter 591 is equal to or more than the foregoing second threshold value (1280) (from 1280 to 1919 both inclusive, right screen 70R), the interpolation position parameter switch section 59 selectively outputs one of the interpolation position parameters Relpos_C_0~Relpos_C_3 so that the value of the interpolation position parameter Relpos is periodically switched in the order of "0", "0.25", "0.5", and "0.75" ("0"→"0.25"→"0.5"→"0.75"), as the value of the V counter 592 (the number of frames) is increased.

Further, in the foregoing embodiments, the description has been given of the case that the liquid crystal display panel (display screen) 70 is divided into the left screen 70L and the right screen 70R, or divided into the left screen 70L, the central screen 70C, and the right screen 70R. However, a method of dividing the display screen 70 in the demonstration mode is not limited thereto. That is, the method of dividing the display screen 70 is not limited to the case in which the display screen 70 is divided into right and left direction (horizontal direction) as in the foregoing embodiments. For example, the display screen 70 may be divided into up and down direction (vertical direction), or may be divided into a diagonal direction. In these cases, the display picture by double rate and the display picture by quadruple rate are also able to be simultaneously displayed in the display screen. For example, in the case where the display screen 70 is divided into an upper screen 70U and a lower screen 70D, or is divided into the upper screen 70U, the central screen 70C, and the lower screen 70D (in the case where the display screen 70 is divided into up and down direction (vertical direction)), specifically, operation may be performed as follows. That is, in the foregoing first embodiment, the read address generated by the read address generation section 442C may be switched as needed according to a magnitude relationship between the value of the number of horizontal lines (horizontal line position) and the given threshold value. In the foregoing second embodiment, the interpolation position parameter switch section 59 may select, may switch as needed, and may output one of the four interpolation position parameters (Relpos_C_0~Relpos_C_3) according to a magnitude relationship between the value of the number of horizontal lines (horizontal line position) and the given threshold value.

Further, in the foregoing embodiments, the description has been given with reference to the liquid crystal display unit as an example of image display units. However, the picture signal processing unit of the invention is able to be applied to an image display unit other than the liquid crystal display unit (for example, an organic EL display unit or the like).

Further, the series of processing described in the foregoing embodiments (or partial processing out of the series of processing) is able to be executed by a hardware, but may be executed by software.

Figure 10:
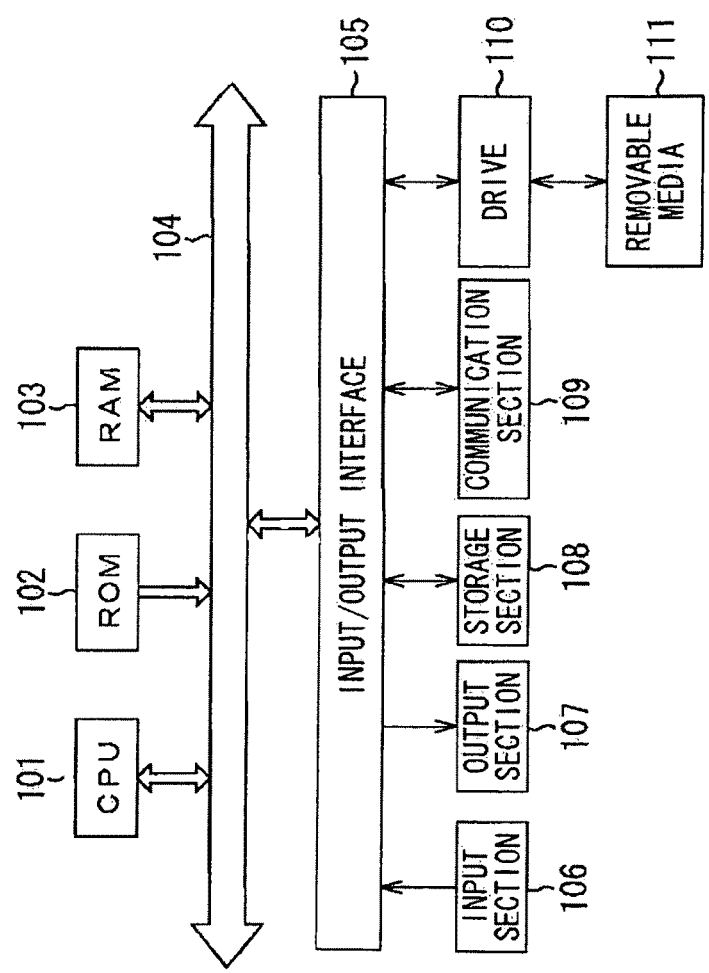
FIG. 10 is a block diagram illustrating an example of a hardware configuration of a whole or a partial picture signal processing unit according to the embodiments of the invention.
Figure 11:
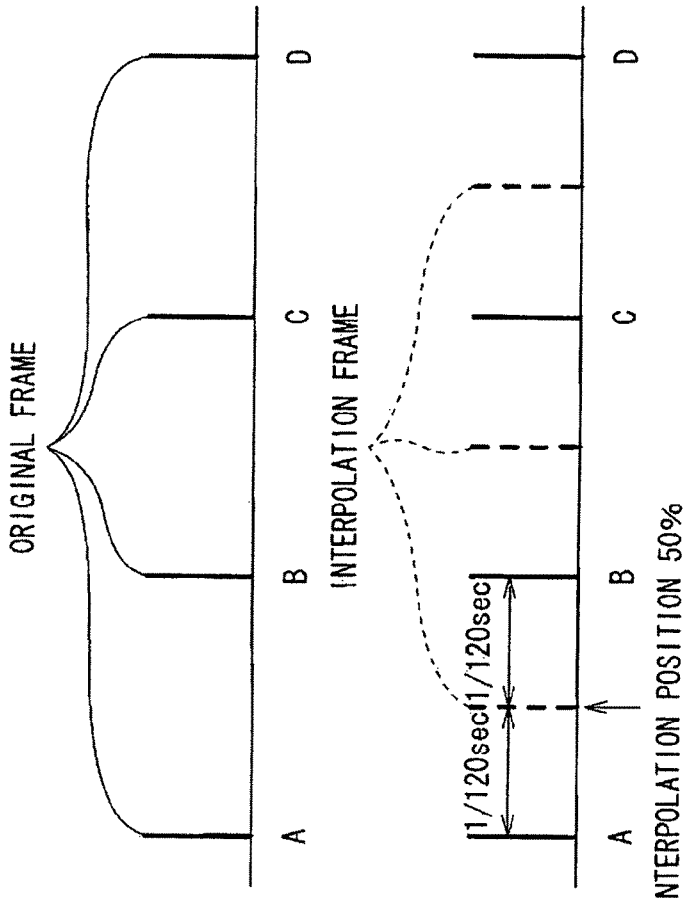
FIGS. 11A and 11B are timing charts for explaining a principle and an interpolation position of frame rate conversion (double rate conversion) of a camera signal.

In this case, the whole or part of the picture signal processing units 4 and 5, the backlight drive section 71, and the timing controller 73 described in the foregoing embodiments are able to be configured by, for example, a computer illustrated in FIG. 10.

In FIG. 10, a CPU (Central Processing Unit) 101 executes various processing according to a program recorded in a ROM (Read Only Memory) 102 or a program loaded from a storage section 108 into a RAM (Random Access Memory) 103. In addition, data necessary for the CPU 101 to execute various processing and the like are stored as appropriate in the RAM 103.

The CPU 101, the ROM 102, and the RAM 103 are connected to each other through a bus 104. Further, an input/output interface 105 is connected to the bus 104.

An input section 106 including a keyboard, a mouse or the like, an output section 107 including a display or the like, a storage section 108 including a hard disk or the like, and a communication section 109 including a modem, a terminal adapter or the like, are connected to the input/output interface 105. The communication section 109 performs communication processing in relation to other device through a network including the Internet.

Further, according to needs, a drive 110 is connected to the input/output interface 105. A removable media 111 including a magnetic disk, an optical disk, a magnetic optical disk, a semiconductor memory or the like is loaded therein as appropriate. A computer program read therefrom is installed in the storage section 108 according to needs.

In the case where a series of processing is to be executed by software, a program configuring the software is installed, from a network or a recording media, on a computer built in a dedicated hardware, on a general purpose personal computer capable of executing various functions by installing various programs, or the like.

The recording media including such a program is, as illustrated in FIG. 10, configured by the removable media (package media 111) including a magnetic disk (including a floppy disk), an optical disk (including a CD-ROM (Compact Disk-Read Only Memory, a DVD, and the like), a magnetic optical disk (including an MD (Mini-disk)), a semiconductor memory or the like in which the program is recorded that is distributed to provide the program for a user separately from the unit body. In addition, the recording media including such a program is configured by the ROM 102, a hard disc included in the storage section 108 or the like in which the program is recorded, that is provided for a user in a state of being previously built in the unit body.

As used herein, a step of describing the program to be recorded in the recording media includes processing executed in the order of time sequence. In addition, the step of describing the program to be recorded in the recording media also includes processing that is not necessarily executed in the order of time sequence but executed in parallel or individually.

Further, as used herein, the system represents the whole unit configured by the plurality of processing units and processing sections, as described above.

Further, the structure and the like described in the foregoing embodiments and the foregoing modified example may be realized in a given combination other than the combination described above.

It should be understood by those skilled in the art that various modifications, combinations, sub combinations and alternations may occur depending on design requirements and other factors insofar as they are within the scope of the appended claims or the equivalents thereof.

What is claimed is:

1. A picture signal processing unit comprising:
    a first double rate conversion section performing double frame rate conversion on an input picture signal configured of original frames through additionally inserting a first interpolation frame between a couple of successive original frames, the first interpolation frame being generated by interpolation with motion compensation from the couple of successive original frames, and then the first double rate conversion section outputting a picture signal configured of the original frames and the first interpolation frames;
    a second double rate conversion section performing double frame rate conversion on the input picture signal through generating a second and a third interpolation frames followed by allocating the second and the third interpolation frames at predetermined time positions between the couple of successive original frames in place of the couple of successive original frames, the second and the third interpolation frames being generated by interpolation with motion compensation from the couple of successive original frames, and then the second double rate conversion section outputting a picture signal configured of the second and the third interpolation frames;
    a storage section storing the original frame and the first to the third interpolation frames; and
    a quadruple rate conversion section performing quadruple frame rate conversion on the input picture signal through sequentially reading out the original frame and the first to the third interpolation frames from the storage sections in a quadruple rate, and then the quadruple rate conversion section outputting an output picture signal configured of the original frame and the first to the third interpolation frames.

2. The picture signal processing unit according to claim 1, the quadruple rate conversion section having:
    a horizontal counter counting horizontal pixel position in a displayed picture displayed based on the output picture signal;
    a vertical counter counting vertical pixel position in the displayed picture; and
    an address generation section generating read addresses used in reading out the original frame and the first to the third interpolation frames from the storage section according to count values in the horizontal counter and the vertical counter,
    wherein the read address is switched as needed according to the count values in the horizontal counter and the vertical counter.

3. The picture signal processing unit according to claim 2, wherein the first interpolation frame is a ½ interpolation frame which is allocated at a interpolation time position of 0.5 in a interval between the couple of successive original frames,
    the second interpolation frame is a ¼ interpolation frame which is allocated at a interpolation time position of 0.25 in a interval between the couple of successive original frames, and
    the third interpolation frame is a ¾ interpolation frame which is allocated at a interpolation time position of 0.75 in a interval between the couple of successive original frames.

4. The picture signal processing unit according to claim 3, wherein
    when the count value of the horizontal counter is less than a given threshold value, the address generation section generates the read addresses so that the original frame, the ¼ interpolation frame, the ½ interpolation frame, and the ¾ interpolation frame are periodically read out in this order as the count value in the vertical counter is increased, and
    when the count value of the horizontal counter is equal to the threshold value or more, the address generation section generates the read addresses so that the original frame and the ½ interpolation frame are periodically read out in this order as the count value in the vertical counter is increased.

5. The picture signal processing unit according to claim 3, wherein
when the count value of the horizontal counter is less than a given first threshold value, the address generation section generates the read addresses so that the original frame, the ¼ interpolation frame, the ½ interpolation frame, and the ¾ interpolation frame are periodically read out in this order as the count value in the vertical counter is increased,
when the count value of the horizontal counter is the first threshold value or more and under a given second threshold value, the address generation section generates the read addresses so that the original frame and the ½ interpolation frame are periodically read out in this order as the count value of the vertical counter is increased, and
when the count value of the horizontal counter is the second threshold value or more, the address generation section generates the read addresses so that only the original frame is read out without depending on the count value of the vertical counter.

6. The picture signal processing unit according to claim 3, wherein
when the count value of the horizontal counter is under a given threshold value, the address generation section generates the read addresses so that the original frame and the ½ interpolation frame are sequentially read out in this order as the count value of the vertical counter is increased, and
when the count value of the horizontal counter is the threshold value or more, the address generation section generates the read addresses so that the original frame, the ¼ interpolation frame, the ½ interpolation frame, and the ¾ interpolation frame are sequentially read out in this order as the value of the vertical counter is increased.

7. The picture signal processing unit according to claim 3, wherein
when the count value of the horizontal counter is under a first threshold value, the address generation section generates the read addresses so that only the original frame is read out without depending on the count value of the vertical counter,
when the count value of the horizontal counter is the first threshold value or more and under a given second threshold value, the address generation section generates the read addresses so that the original frame and the ½ interpolation frame are periodically read out in this order as the count value of the vertical counter is increased, and
when the count value of the horizontal counter is the second threshold value or more, the address generation section generates the read addresses so that the original frame, the ¼ interpolation frame, the ½ interpolation frame, and the ¾ interpolation frame are periodically read out in this order as the count value of the vertical counter is increased.

8. The picture signal processing unit according to claim 1, wherein one of the first and the second double rate conversion sections outputs a frame for black display, and thereby black insertion processing is performed on the output picture signal.

9. The picture signal processing unit according to claim 8, wherein the output picture signal is a picture signal applied to a liquid crystal display device.

10. A picture signal processing unit comprising:
a quadruple rate conversion section performing quadruple frame rate conversion on a input picture signal configured of original frames through additionally inserting a first to a third interpolation frames between a couple of successive original frames, the first to the third interpolation frames being generated by interpolation with motion compensation from the couple of successive original frames, and then the quadruple rate conversion section outputting an output picture signal configured of the original frame and the first to the third interpolation frames;
a horizontal counter counting horizontal pixel position in a displayed picture displayed based on the output picture signal;
a vertical counter counting vertical pixel position in the displayed picture; and
a parameter switch section selecting one of four interpolation position parameters configured of an interpolation position parameter corresponding to the original frame and interpolation position parameters corresponding to the first to the third interpolation frames according to count values in the horizontal counter and the vertical counter, and the parameter switch section switching the four interpolation position parameters, as needed, to output one of the four interpolation position parameters to the quadruple rate conversion section.

11. The picture signal processing unit according to claim 10, wherein the parameter switch section selectively outputs one of the interpolation position parameters so that:
when the count value of the horizontal counter is less than a given threshold value, a value of the outputted interpolation position parameter is periodically switched in an order of 0, 0.25, 0.5, and 0.75 as the count value of the vertical counter is increased; and
when the count value of the horizontal counter is equal to the threshold value or more, the outputted value of the interpolation position parameter is periodically switched in an order of 0 and 0.5 as the count value of the vertical counter is increased.

12. The picture signal processing unit according to claim 10, wherein the parameter switch section selectively outputs one of the interpolation position parameters so that:
when the count value of the horizontal counter is under a given first threshold value, a value of the outputted interpolation position parameter is periodically switched in an order of 0, 0.25, 0.5, and 0.75 as the count value of the vertical counter is increased;
when the count value of the horizontal counter is the first threshold value or more and under a given second threshold value, the value of the outputted interpolation position parameter is periodically switched in an order of 0 and 0.5 as the count value of the vertical counter is increased, and
the parameter switch section, when the count value of the horizontal counter is the second threshold value or more, outputs 0 as the value of the outputted interpolation position parameter without depending on the count value of the vertical counter.

13. The picture signal processing unit according to claim 10, wherein the parameter switch section selectively outputs one of the interpolation position parameters so that:
when the count value of the horizontal counter is under a given threshold value, a value of the outputted interpolation position parameter is periodically switched in an order of 0 and 0.5 as the count value of the vertical counter is increased; and when the count value of the horizontal counter is the threshold value or more, the value of the outputted interpolation position parameter is periodically switched in an order of 0, 0.25, 0.5, and 0.75 as the count value of the vertical counter is increased.

14. The picture signal processing unit according to claim 10, wherein the parameter switch section, when the count value of the horizontal counter is under a given first threshold value, outputs 0 as a value of the outputted interpolation position parameter without depending on the count value of the vertical counter, the parameter switch section selectively outputs one of the interpolation position parameters so that:

when the count value of the horizontal counter is the first threshold value or more and under a given second threshold value, the value of the outputted interpolation position parameter is periodically switched in an order of 0 and 0.5 as the count value of the vertical counter is increased; and when the count value of the horizontal counter is the second threshold value or more, the value of the outputted interpolation position parameter is periodically switched in an order of 0, 0.25, 0.5, and 0.75 as the count value of the vertical counter is increased.

15. An image display unit comprising:

a first double rate conversion section performing double frame rate conversion on an input picture signal configured of original frames through additionally inserting a first interpolation frame between a couple of successive original frames, the first interpolation frame being generated by interpolation with motion compensation from the couple of successive original frames, and then the first double rate conversion section outputting a picture signal configured of the original frames and the first interpolation frames;

a second double rate conversion section performing double frame rate conversion on the input picture signal through generating a second and a third interpolation frames followed by allocating the second and the third interpolation frames at predetermined time positions between the couple of successive original frames in place of the couple of successive original frames, the second and the third interpolation frames being generated by interpolation with motion compensation from the couple of successive original frames, and then the second double rate conversion section outputting a picture signal configured of the second and the third interpolation frames;

a storage section storing the original frame and the first to the third interpolation frames;

a quadruple rate conversion section performing quadruple frame rate conversion on the input picture signal through sequentially reading out the original frame and the first to the third interpolation frames from the storage sections in a quadruple rate, and then the quadruple rate conversion section outputting an output picture signal configured of the original frame and the first to the third interpolation frames; and a display section displaying a picture based on the output picture signal outputted from the quadruple rate conversion section.

16. An image display unit comprising:

a quadruple rate conversion section performing quadruple frame rate conversion on a input picture signal configured of original frames through additionally inserting a first to a third interpolation frames between a couple of successive original frames, the first to the third interpolation frames being generated by interpolation with motion compensation from the couple of successive original frames, and then the quadruple rate conversion section outputting an output picture signal configured of the original frame and the first to the third interpolation frames;

a horizontal counter counting horizontal pixel position in a displayed picture displayed based on the output picture signal;

a vertical counter counting vertical pixel position in the displayed picture;

a parameter switch section selecting one of four interpolation position parameters configured of an interpolation position parameter corresponding to the original frame and interpolation position parameters corresponding to the first to the third interpolation frames according to count values in the horizontal counter and the vertical counter, and the parameter switch section switching the four interpolation position parameters, as needed, to output one of the four interpolation position parameters to the quadruple rate conversion section; and a display section displaying a picture based on the output picture signal outputted from the quadruple rate conversion section.

17. A picture signal processing method comprising the steps of:

performing double frame rate conversion on an input picture signal configured of original frames through additionally inserting a first interpolation frame between a couple of successive original frames, the first interpolation frame being generated by interpolation with motion compensation from the couple of successive original frames, and then outputting a picture signal configured of the original frames and the first interpolation frames;

performing double frame rate conversion on the input picture signal through generating a second and a third interpolation frames followed by allocating the second and the third interpolation frames at predetermined time positions between the couple of successive original frames in place of the couple of successive original frames, the second and the third interpolation frames being generated by interpolation with motion compensation from the couple of successive original frames, and then outputting a picture signal configured of the second and the third interpolation frames;

storing the original frame and the first to the third interpolation frames; and performing quadruple frame rate conversion on the input picture signal through sequentially reading out the original frame and the first to the third interpolation frames in a quadruple rate, and then outputting an output picture signal configured of the original frame and the first to the third interpolation frames.

18. A picture signal processing method comprising the steps of:

performing quadruple frame rate conversion on a input picture signal configured of original frames through additionally inserting a first to a third interpolation frames between a couple of successive original frames, the first to the third interpolation frames being generated by interpolation with motion compensation from the couple of successive original frames, and then outputting an output picture signal configured of the original frame and the first to the third interpolation frames; and selecting one of four interpolation position parameters configured of an interpolation position parameter corresponding to the original frame and interpolation position parameters corresponding to the first to the third interpolation frames according to count values in a horizontal counter and a vertical counter, and switching the four interpolation position parameters, as needed, to output one of the four interpolation position parameters,
wherein the selected and outputted interpolation position parameter is used in the quadruple rate frame rate conversion.

* * * * *